US012802718B2

(12) United States Patent
Sakane

(10) Patent No.: US 12,802,718 B2
(45) Date of Patent: Nov. 17, 2026

(54) OPTICAL DISC DRIVE INCLUDING A POSITION-CHANGING PULLEY

(71) Applicant: Sony Interactive Entertainment Inc., Tokyo (JP)

(72) Inventor: Ryoto Sakane, Tokyo (JP)

(73) Assignee: SONY INTERACTIVE ENTERTAINMENT INC., Tokyo (JP)

(*) Notice: Subject to any disclaimer, the term of this patent is extended or adjusted under 35 U.S.C. 154(b) by 0 days.

(21) Appl. No.: 19/129,116

(22) PCT Filed: Nov. 28, 2023

(86) PCT No.: PCT/JP2023/042612
§ 371 (c)(1),
(2) Date: May 12, 2025

(87) PCT Pub. No.: WO2024/122413
PCT Pub. Date: Jun. 13, 2024

(65) Prior Publication Data

US 2026/0179653 A1 Jun. 25, 2026

(30) Foreign Application Priority Data

Dec. 6, 2022 (JP) ................................ 2022-195195

(51) Int. Cl.
*G11B 17/051* (2006.01)
*G11B 17/028* (2006.01)
*G11B 17/056* (2006.01)

(52) U.S. Cl.
CPC ........ *G11B 17/051* (2013.01); *G11B 17/0282* (2013.01); *G11B 17/0284* (2013.01); *G11B 17/0288* (2013.01); *G11B 17/056* (2013.01)

(58) Field of Classification Search
None
See application file for complete search history.

(56) References Cited

U.S. PATENT DOCUMENTS 6,577,580 B2 * 6/2003 Haga .................. G11B 17/0284
720/619
7,272,838 B2 * 9/2007 Kido .................... G11B 17/051
720/624

(Continued)

FOREIGN PATENT DOCUMENTS

JP 07-169165 A 7/1995
JP 07240084 A 9/1995

(Continued)

OTHER PUBLICATIONS

International Search Report for corresponding Application No. PCT/JP2023/042612, 6 pages, dated Feb. 13, 2024.

(Continued)

*Primary Examiner* — Craig A. Renner
(74) *Attorney, Agent, or Firm* — Kilpatrick Townsend & Stockton LLP

(57) ABSTRACT

To provide an optical disc drive with a smaller number of components. The optical disc drive includes a turntable for rotating an optical disc, a chuck pulley, a top frame having an opening formed at a position overlapping the chuck pulley in a plan view, and a first arm that holds the chuck pulley, in which the first arm contacts a first guide section of the opening and changes the posture so as to move the chuck pulley between the stand-by position and the chuck position at which the first arm and the turntable sandwich the optical disc depending on a position at which the first arm contacts the first guide section.

13 Claims, 21 Drawing Sheets

(56) References Cited

U.S. PATENT DOCUMENTS

| | | | | |
|---|---|---|---|---|
| 7,669,211 | B2 * | 2/2010 | Chen .................. | G11B 17/0565 720/714 |
| 8,413,176 | B2 * | 4/2013 | Maeda et al. ...... | G11B 17/0515 720/604 |
| 2006/0209662 | A1 | 9/2006 | Chen | |

FOREIGN PATENT DOCUMENTS

| | | | |
|---|---|---|---|
| JP | 2015-022779 | A | 2/2015 |
| JP | 2015-022780 | A | 2/2015 |
| WO | 2021200231 | A1 | 10/2021 |
| WO | 2021200232 | A1 | 10/2021 |
| WO | 2021200606 | A1 | 10/2021 |
| WO | 2021200608 | A1 | 10/2021 |

OTHER PUBLICATIONS

Application No. JP2024-562712 , Notice of Decision to Grant, Mailed on Sep. 30, 2025, 3 pages.

Application No. PCT/JP2023/042612 , International Preliminary Report on Patentability, Mailed on Jun. 19, 2025, 5 pages.

* cited by examiner

OPTICAL DISC DRIVE INCLUDING A POSITION-CHANGING PULLEY

CROSS-REFERENCE TO RELATED APPLICATIONS

This application is a U.S. National Stage Application under 35 U.S.C. § 371 of International Application No. PCT/JP2023/042612, filed Nov. 28, 2023, which claims priority to Japanese Application No. 2022-195195, filed Dec. 6, 2022, the entire disclosures of which are incorporated herein by reference for all purposes.

TECHNICAL FIELD

The present invention relates to an optical disc drive.

BACKGROUND ART

PTLs 1 to 3 described below disclose optical disc drives that can be mounted on electronic equipment such as game consoles, personal computers, or AV (audio-visual) equipment. An optical disc drive has a transport roller that contacts an optical disc inserted from an insertion port formed on the front surface of the optical disc drive, and transports the optical disc to the position of a spindle motor, and a chuck pulley that magnetically fixes, to the spindle motor, the optical disc having reached the position of the spindle motor.

CITATION LIST

Patent Literature

[PTL 1]
Japanese Patent Laid-open No. 2015-022780
[PTL 2]
Japanese Patent Laid-open No. 2015-022779
[PTL 3]
U.S. Patent Application Publication No. 2006/0209662

SUMMARY

Technical Problem

Here, the optical disc drive has a mechanism that moves the chuck pulley in the up-down direction in order to fix the chuck pulley to the spindle motor or separate the chuck pulley from the spindle motor. The number of components increases undesirably in order to realize this mechanism, in some cases.

An object of the present invention is to provide an optical disc drive with a smaller number of components.

Solution to Problem

An optical disc drive according to the present disclosure includes a turntable for rotating an optical disc, a chuck pulley, a top frame having an opening formed at a position overlapping the chuck pulley in a plan view, and a first arm that holds the chuck pulley, in which the first arm includes an inclined surface at a lower portion thereof, contacts a first edge of the opening, and changes a posture so as to move the chuck pulley between a stand-by position and a chuck position at which the first arm and the turntable sandwich the optical disc depending on a position at which the inclined surface contacts the first edge.

DESCRIPTION OF EMBODIMENT

Hereinbelow, an embodiment of the present invention (hereinbelow, the present embodiment) is explained with reference to the figures. In the following explanation, X1 and X2 depicted in the figures represent the right direction and the left direction, respectively, Y1 and Y2 depicted in the figures represent the forward direction and the backward direction, respectively, and Z1 and Z2 depicted in the figures represent the upward direction and the downward direction, respectively. In an example depicted in the present embodiment, an optical disc is inserted into an optical disc drive 1 in the backward direction from the forward direction. In the present embodiment, a direction in which the rotation axis O (see FIG. 4B) of a turntable 30 extends is the up-down direction. In addition, in the present embodiment, the right rotating direction as seen from above is the clockwise direction, and the left rotating direction as seen from above is the counterclockwise direction.

[Summary of Configuration of Optical Disc Drive 1]

Figure 1:
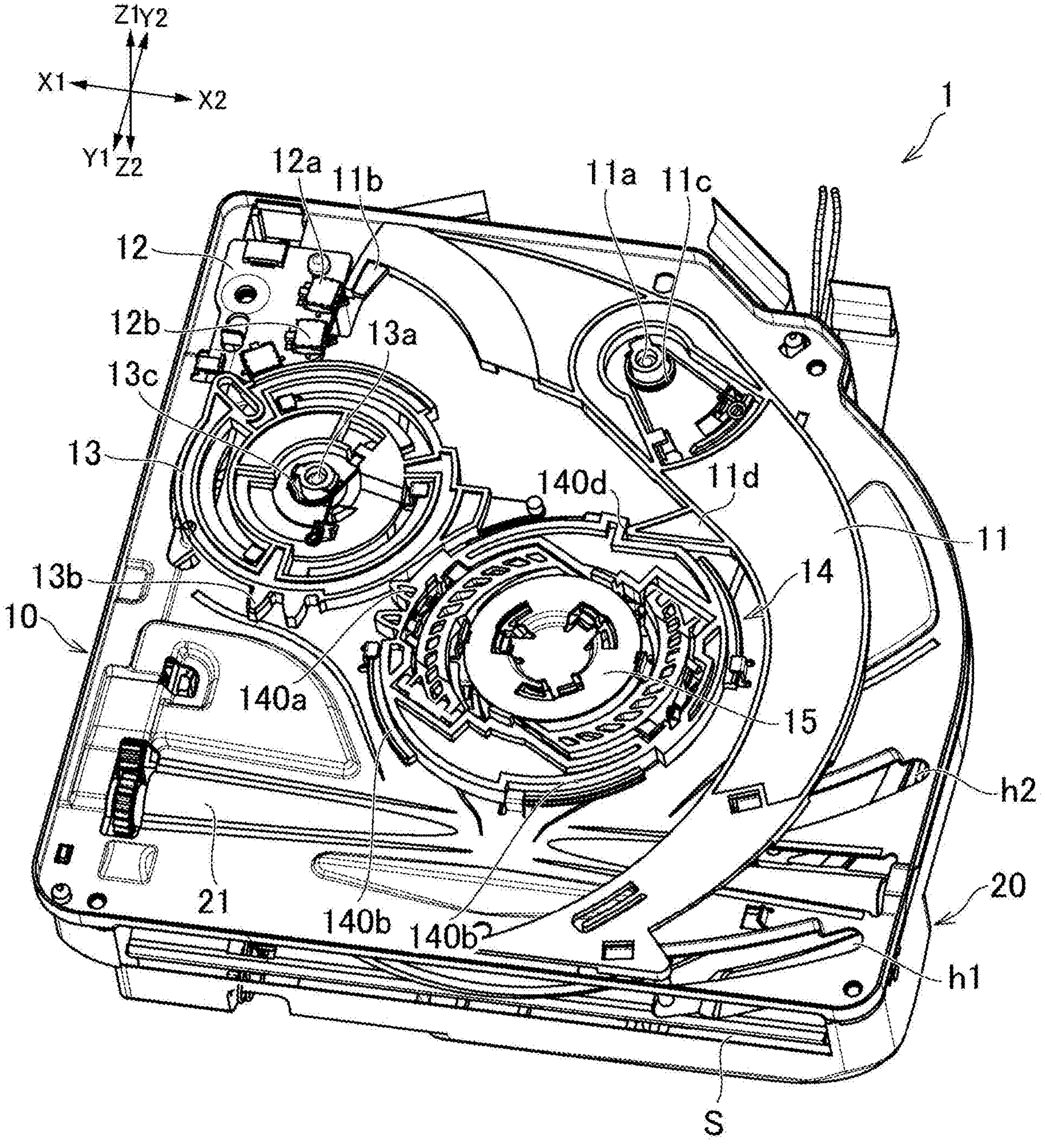
FIG. 1 is a perspective view depicting the internal structure of an optical disc drive according to the present embodiment.
Figure 2A:
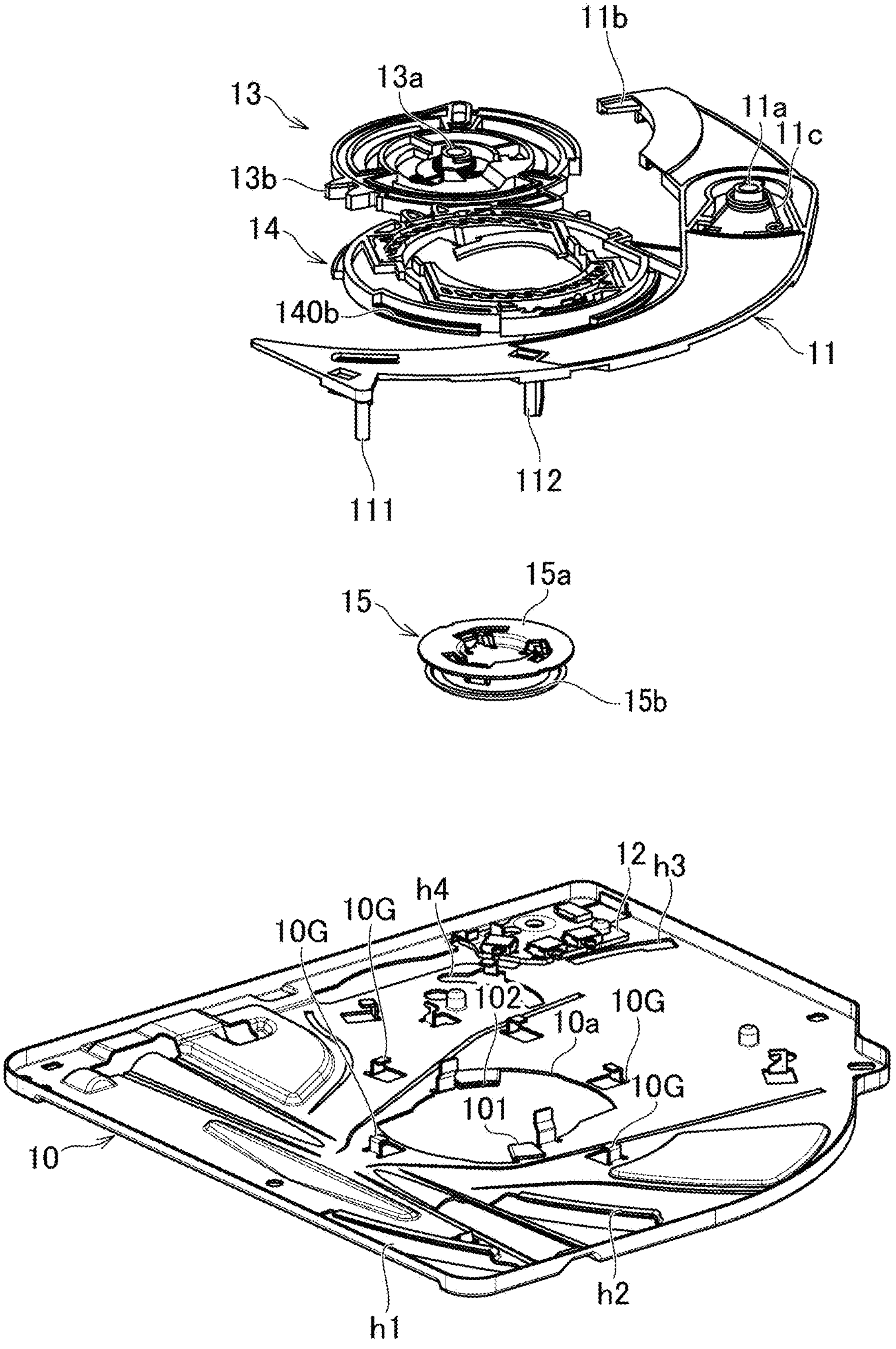
FIG. 2A is an exploded perspective view depicting a top frame and each component attached to the top frame.
Figure 2B:
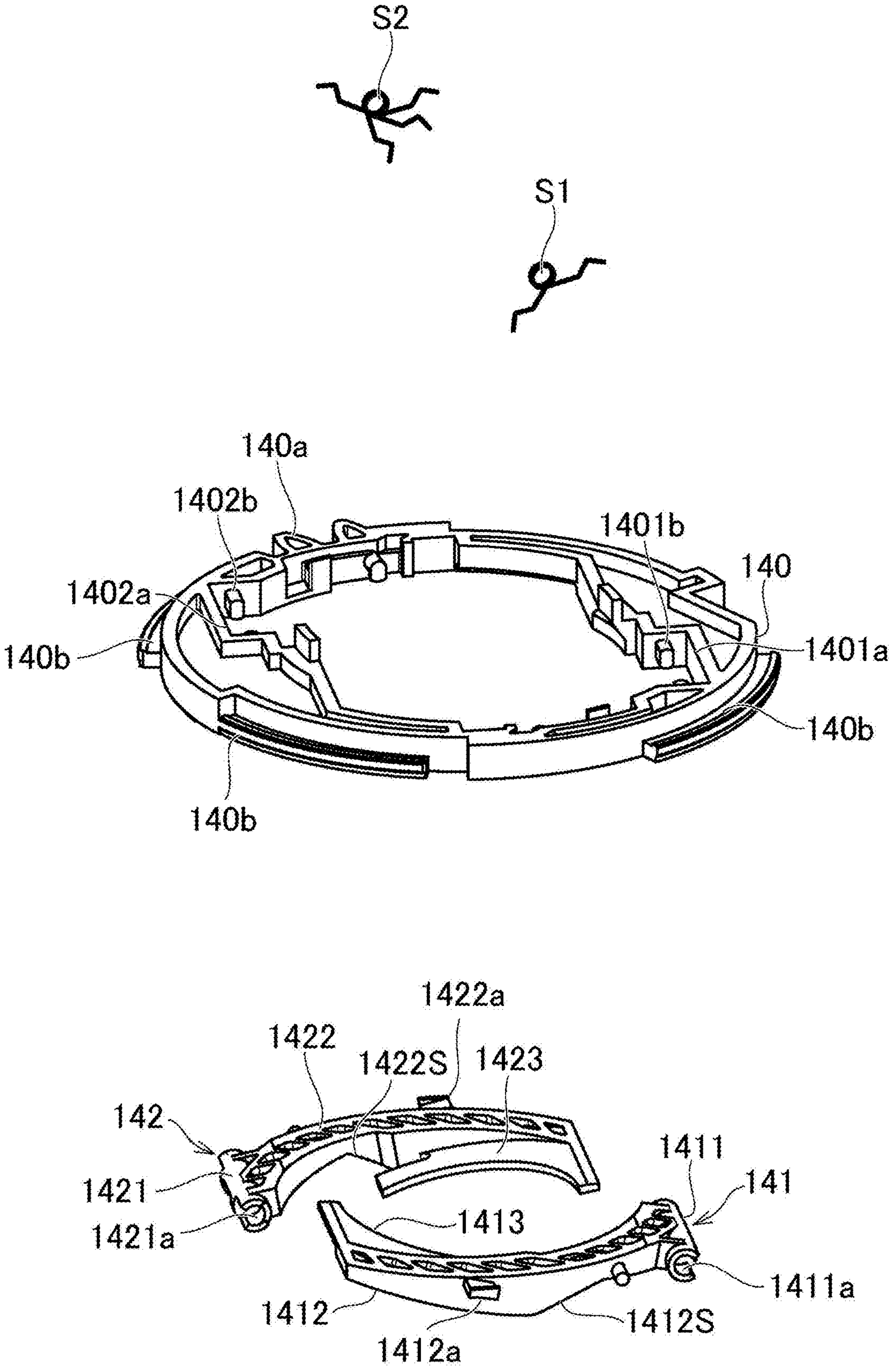
FIG. 2B is an exploded perspective view depicting a pulley holding mechanism.

FIG. 1 is a perspective view depicting the internal structure of an optical disc drive according to the present embodiment. FIG. 2A is an exploded perspective view depicting a top frame and each component attached to the top frame. FIG. 2B is an exploded perspective view depicting a pulley holding mechanism. Note that the optical disc drive 1 may have an exterior case that houses the structure depicted in FIG. 1, although an illustration thereof is omitted.

The optical disc drive 1 is an apparatus that reads out information stored on an optical disc using laser light or the like. As depicted in FIG. 1, an insertion port S to which the optical disc is inserted is formed at the front of the optical disc drive 1. For example, the optical disc is an information recording medium such as a CD (compact disc), a DVD (digital versatile disc), or a Blu-Ray Disc (registered trademark). For example, the optical disc drive 1 may be compatible with an optical disc with the diameter of 12 cm. The optical disc drive 1 is housed in a cabinet of electronic equipment such as a game console, a personal computer, or AV equipment. Alternatively, the optical disc drive 1 may be configured such that the optical disc drive 1 can be attached to and detached from electronic equipment.

The optical disc drive 1 has a top frame 10 and a bottom frame 20. The top frame 10 is attached to the upper side of the bottom frame 20. The top frame 10 may be tabular metal. The bottom frame 20 may have a box shape and include a resin material. A cut is formed at the front of the bottom frame 20, and the cut and the top frame 10 form the insertion port S.

In addition, the optical disc drive 1 has a base frame that is arranged below the top frame 10 and on the inner side of the bottom frame 20 and holds the turntable 30 (see FIG. 4B). The optical disc inserted from the insertion port S is arranged between the top frame 10 and the base frame arranged on the inner side of the bottom frame 20. For example, the turntable 30 may be a spindle motor that rotates the optical disc.

[Summary of Configuration of Optical Disc Drive 1: Top Frame 10]

As depicted in FIG. 2A, the top frame 10 is a metal sheet processed such that openings and irregularities are formed therethrough or thereon. Specifically, an opening 10*a*, guide holes h1 to h4, guide sections 10G, and the like are formed through or on the top frame 10.

The opening 10*a* is a through-hole for moving a chuck pulley 15 in the up-down direction. The opening 10*a* is formed at a position overlapping the chuck pulley 15 in a plan view (top view). Guide sections 101 and 102 that contact a first arm 141 and a second arm 142 mentioned later are formed at the edge of the opening 10*a*. The guide section 101, which is a first edge, is a portion that changes the posture of the first arm 141 mentioned later, and the guide section 102, which is a second edge, is a portion that changes the posture of the second arm 142 mentioned later.

The guide sections 101 and 102 have shapes extending along the rotation direction of an annular section 140 mentioned later, and the guide section 101 is shorter than the guide section 102. The guide sections 101 and 102 may be portions formed by what is called hemming processing. That is, the guide sections 101 and 102 may be portions including a dual-layer plate formed by bending a part of the top frame 10 including a metal sheet.

The guide holes h1 to h3 are through-holes that guide the movement of a switch arm 11. The guide hole h4 is a through-hole that guides the rotation of a rotary arm 13.

As depicted in FIG. 1, the top surface side of the top frame 10 is provided with the switch arm 11, a switch board 12, the rotary arm 13, a pulley holding mechanism 14, the chuck pulley 15, and the like.

[Summary of Configuration of Optical Disc Drive 1: Switch Arm 11]

The switch arm 11 has an approximately arc shape positioned at a left section and a rear section of the top frame 10 and curved along the outer edge of the top frame 10. The switch arm 11 is provided to be rotatable about a supported section 11*a* supported by the top frame 10 as the rotation axis.

As depicted in FIG. 2A, the switch arm 11 has a contact section 111 protruding below the top frame 10 through the guide hole h1 formed through the top frame 10, and a contact section 112 protruding below the top frame through the guide hole h2 formed through the top frame 10. In addition, the switch arm 11 has a contact section (not illustrated in FIG. 2A) protruding below the top frame 10 through the guide hole h3. The contact sections 111 and 112 move along the shapes of the guide holes h1 and h2 when the edge of the optical disc inserted from the insertion port S hits the contact sections 111 and 112. Thus, the switch arm 11 rotates counterclockwise about the supported section 11*a* as the rotation axis. In addition, an urging spring 11*c* that urges the switch arm 11 clockwise is attached to the switch arm 11.

The switch arm 11 has a switch operation section 11*b* at its rear right section. The switch operation section 11*b* has such a shape that the switch operation section 11*b* is caused to press a switch implemented on the switch board 12 by the switch arm 11 rotating counterclockwise about the supported section 11*a* as the rotation axis.

[Summary of Configuration of Optical Disc Drive 1: Switch Board 12]

The switch board 12 is positioned at the right rear of the top frame 10. A start switch 12*a* and a stop switch 12*b* are implemented on the switch board 12. The start switch 12*a* is positioned behind the stop switch 12*b*.

[Summary of Configuration of Optical Disc Drive 1: Rotary Arm 13]

The rotary arm 13 is positioned before the switch board 12. The rotary arm 13 has a disc-like shape, and is provided to be rotatable about a supported section 13*a* supported by the top frame 10 as the rotation axis. The rotary arm 13 has a contact section protruding below the top frame 10 through the guide hole h4 formed through the top frame 10. The rotary arm 13 is rotated counterclockwise about the supported section 13*a* as the rotation axis by the edge of the optical disc inserted from the insertion port S hitting the contact section. In addition, the rotary arm 13 has a protruding section 13*b* at its outer circumferential section. An urging spring 13*c* is attached on the inner side of the rotary arm 13. The urging spring 13*c* urges the rotary arm 13 clockwise.

[Summary of Configuration of Optical Disc Drive 1: Chuck Pulley 15]

As depicted in FIG. 2A, the chuck pulley 15 has an upper flange 15*a* and a lower flange 15*b* sticking out from the outer circumferential section of the chuck pulley 15 in the radial direction. The upper flange 15*a* is formed at the upper end of the chuck pulley 15, and the lower flange 15*b* is formed at the lower end of the chuck pulley 15.

The chuck pulley 15 is a member for fixing the optical disc to the turntable 30. The optical disc is sandwiched and held by the chuck pulley 15 and the turntable 30 due to the magnetic attraction of the chuck pulley 15 to the turntable 30. Thus, the optical disc rotates integrally with the turntable 30. Note that the chuck pulley 15 may be a magnetic material or may include a magnet partially.

[Summary of Configuration of Optical Disc Drive 1: Pulley Holding Mechanism 14]

As depicted in FIG. 2B, the pulley holding mechanism 14 includes the annular section 140, the first arm 141, and the second arm 142.

The annular section 140 has an annular shape, has a protruding section 140*a* at the outer circumferential section of the annular section 140, and is rotated by the protruding section 13*b* of the rotary arm 13 hitting the protruding section 140*a*. Specifically, the annular section 140 is rotated clockwise by the protruding section 13*b* hitting the protruding section 140*a* when the rotary arm 13 rotates counterclockwise.

In addition, the annular section 140 has, at its outer circumferential section, rail sections 140*b* formed along the circumferential direction. The rail sections 140*b* function as guide rails that guide the rotation of the annular section 140. The rail sections 140*b* are formed to be able to slide along the guide section 10G (see FIG. 2A) formed on the top frame 10. Note that the guide sections 10G have shapes protruding upward and having upper ends which are bent toward the inner side in the radial direction of the annular section 140. With such shapes, the guide sections 10G mesh the rail sections 140 *b*. In an example depicted in FIG. 2A, four guide sections 10G are formed on the top frame 10, and the rail sections 140*b* are formed on the annular section 140 such that the rail sections 140*b* correspond to the guide sections 10G.

The first arm 141 and the second arm 142 are members that move the chuck pulley 15 between the stand-by position and the chuck position. The first arm 141 and the second arm 142 are arranged to face each other with the opening 10*a* being interposed therebetween. The first arm 141 and the second arm 142 are supported rotatably by the annular section 140. Positions at which the first arm 141 and the second arm 142 contact the guide sections 101 and 102 formed on the top frame 10 change along with the rotation of the annular section 140. Thereby, the first arm 141 and the second arm 142 change their posture such that the chuck pulley 15 moves between the stand-by position and the chuck position.

Here, the chuck position is a position of the chuck pulley 15 at which the chuck pulley 15 and the turntable 30 sandwich the optical disc, and the stand-by position is a position of the chuck pulley 15 at which the chuck pulley 15 is apart from the turntable 30 as compared to when the chuck pulley 15 is at the chuck position. That is, the stand-by position is a position above the chuck position. Note that details of the configurations and operation of the first arm 141 and the second arm 142 are mentioned later.

[Summary of Configuration of Optical Disc Drive: Bottom Frame]

The bottom frame 20 holds a transport roller 21, a motor (not illustrated), which is an electric motor, and the like. The motor is provided to be able to be electrically connected with the switch board 12 mentioned later via a wire. The transport roller 21 rotates on the basis of motive power from the motor. The transport roller 21 contacts the lower surface of the optical disc, and transports the optical disc in the forward-backward direction. Specifically, by being rotated, the transport roller 21 transports the optical disc inserted from the insertion port S to a position where the center of the optical disc coincides with the rotation center of the turntable 30. In addition, when the optical disc is taken out from the optical disc drive 1, by being rotated, the transport roller 21 transports the optical disc from the position at which the center of the optical disc coincides with the rotation center of the turntable 30 to the outside of the insertion port S.

[Details of Configurations of First Arm 141 and Second Arm 142]

Hereinbelow, details of the configurations of the first arm 141 and the second arm 142 are explained mainly with reference to FIG. 2B, and FIG. 3A to FIG. 3C.

Figure 3A:
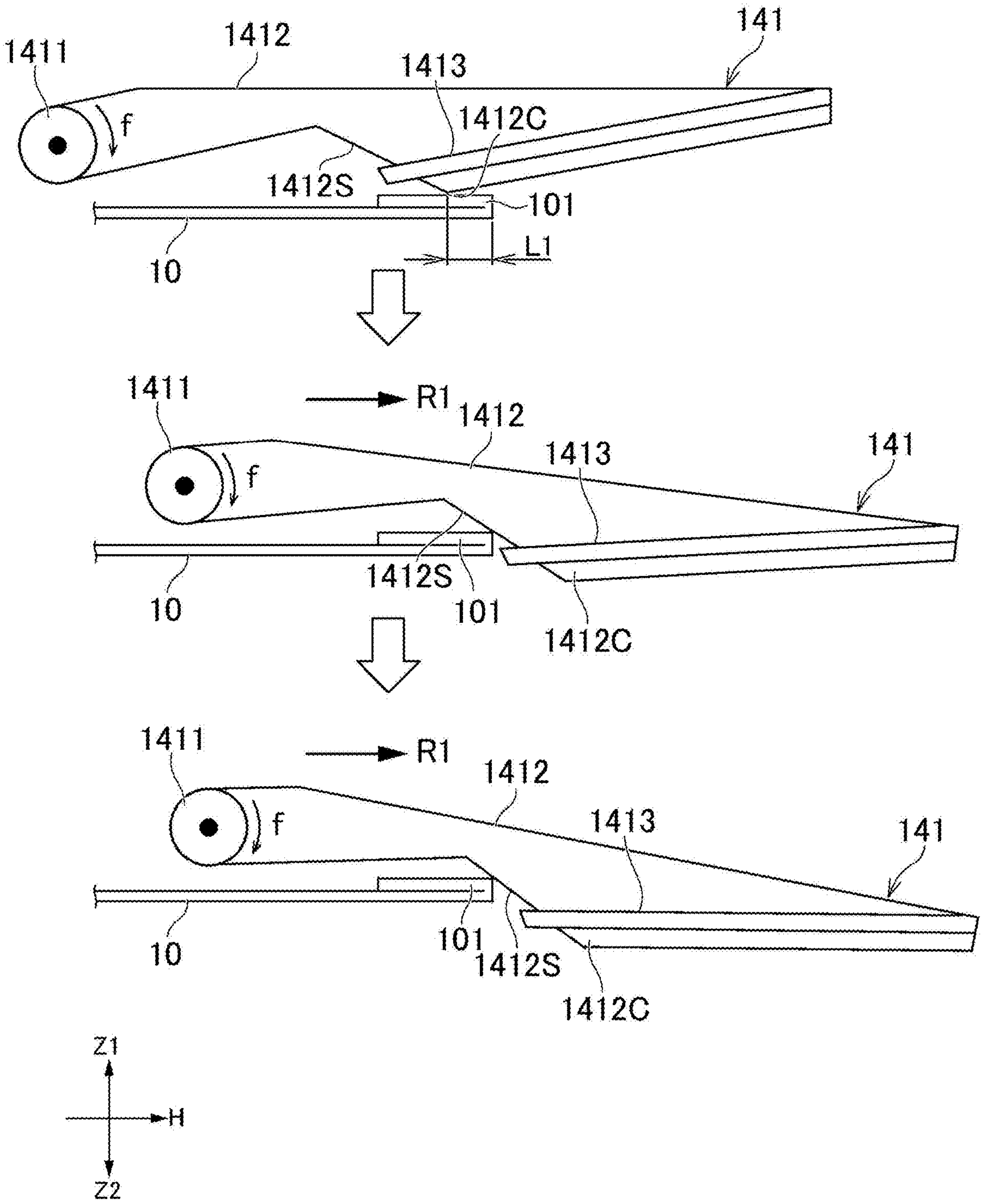
FIG. 3A is a figure schematically depicting the configuration and operation of a first arm.
Figure 3B:
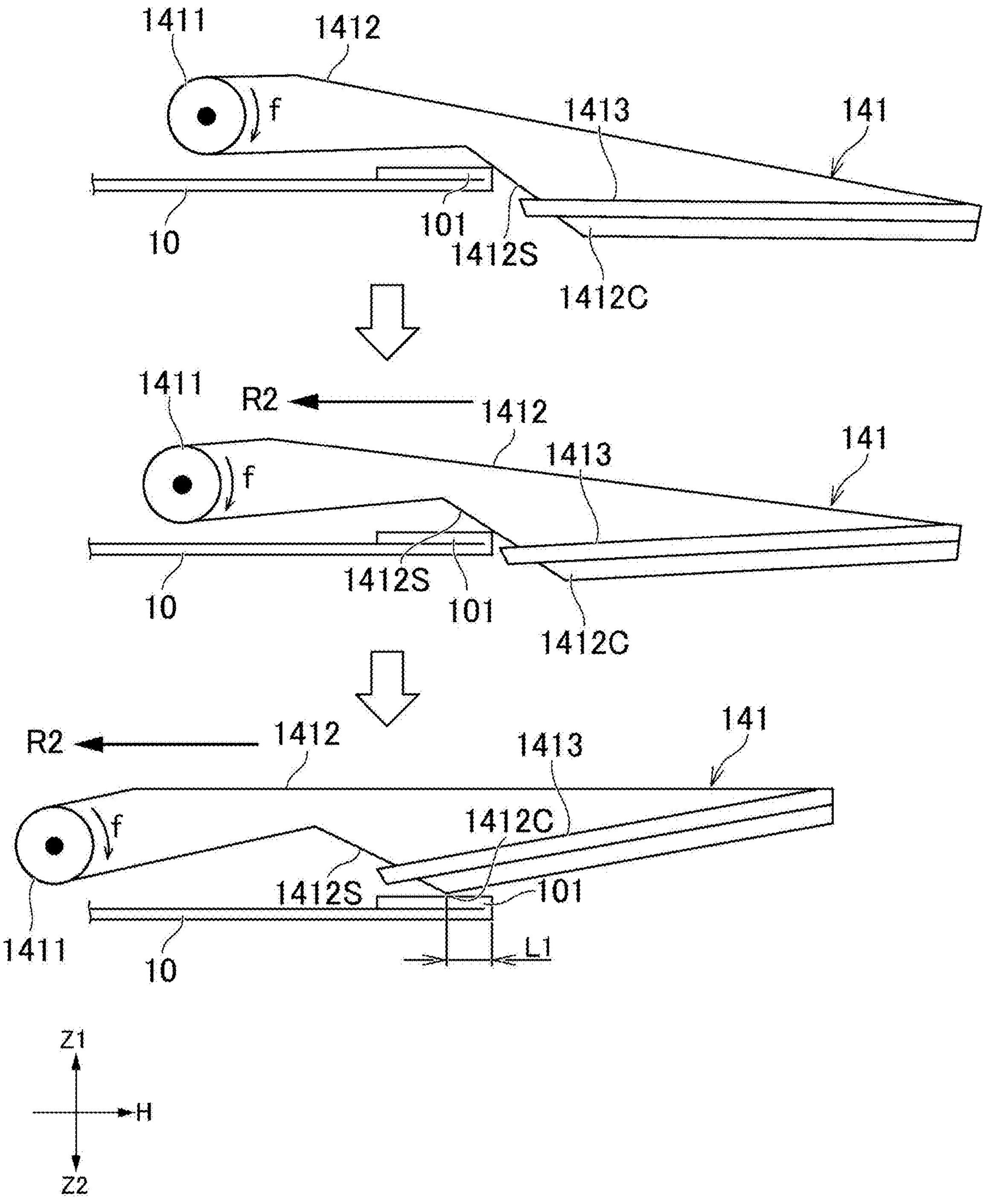
FIG. 3B is a figure schematically depicting the configuration and operation of the first arm.
Figure 3C:
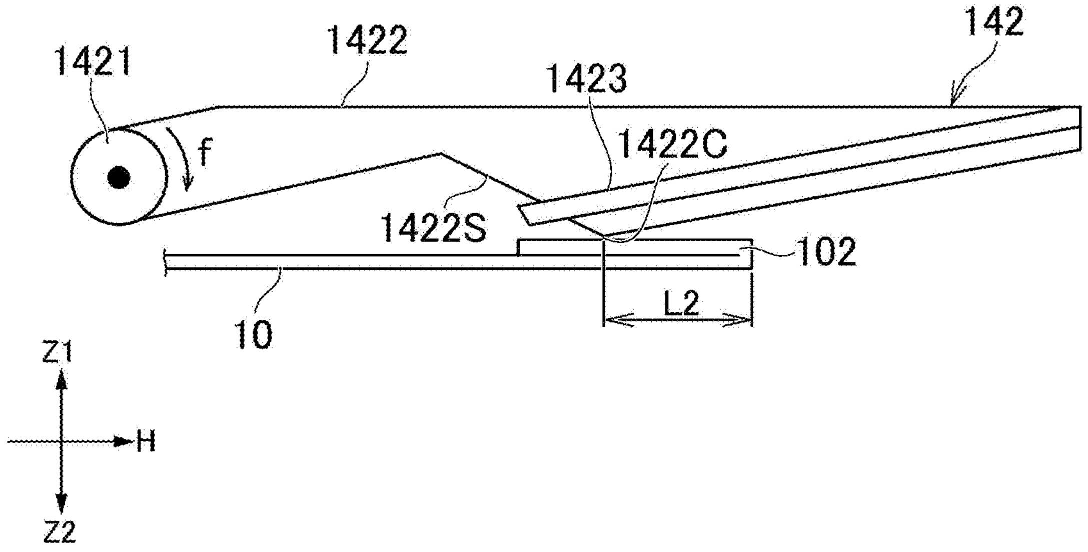
FIG. 3C is a figure schematically depicting the configuration of a second arm.

FIG. 3A and FIG. 3B are figures schematically depicting the configuration and operation of the first arm. FIG. 3C is a figure schematically depicting the configuration of a second arm. FIG. 3A and FIG. 3B depict states of the first arm 141 as seen from the inner side of the annular section 140. FIG. 3C depicts a state of the second arm 142 as seen from the inner side of the annular section 140.

FIG. 3A depicts operation of the first arm 141 when the optical disc is inserted into the optical disc drive 1. More specifically, the top figure in FIG. 3A depicts the posture of the first arm 141 in the stand-by state, the middle figure in FIG. 3A depicts the posture of the first arm 141 while the optical disc is being inserted, and the bottom figure in FIG. 3A depicts the posture of the first arm 141 in the chuck state. FIG. 3B depicts operation of the first arm 141 when the optical disc is taken out from the optical disc drive 1. That is, FIG. 3B depicts the reverse operation of the operation depicted in FIG. 3A.

In the present embodiment, the stand-by state means a state of the optical disc drive 1 before the optical disc is inserted into the optical disc drive 1. The chuck state means a state of the optical disc drive 1 after the chuck pulley 15 is moved to the chuck position.

R1 in FIG. 3A represents the clockwise direction, and R2 in FIG. 3B represents the counterclockwise direction. In addition, H in FIG. 3A to FIG. 3C represents the horizontal direction. In the present embodiment, the horizontal direction H is a direction parallel to the front surface of the optical disc inserted into the optical disc drive 1.

The first arm 141 and the second arm 142 are members that move the chuck pulley 15 in the up-down direction. In the stand-by state, the chuck pulley 15 is held by the first arm 141 and the second arm 142 such that the chuck pulley 15 is arranged at the stand-by position apart from the turntable 30. In addition, in the chuck state, the chuck pulley 15 is held by the first arm 141 and the second arm 142 such that the chuck pulley 15 is arranged at the chuck position where the chuck pulley 15 rotates integrally with the turntable 30.

The first arm 141 includes a supported section 1411 supported to be rotatable about the annular section 140, an arm section 1412 that extends from the supported section 1411 along the inner circumferential surface of the annular section 140, and a holding section 1413 that is arranged on the inner side of the arm section 1412 in the radial direction of the annular section 140 and holds the chuck pulley 15 by hooking a part of the upper flange 15*a* of the chuck pulley 15. The holding section 1413 has a shape extending along the circumferential direction of the annular section 140.

As depicted in FIG. 2B, the supported section 1411 has a bearing 1411*a*. The annular section 140 has a pair of support pins 1401*b* arranged at a recessed section 1401*a* formed on the inner surface of the annular section 140. The supported section 1411 is supported rotatably by the annular section 140 due to the fitting of the support pins 1401*b* into the bearing 1411*a*.

In addition, the first arm 141 is urged by an urging spring S1 such that the tip side of the arm section 1412 inclines downward. In FIG. 3A and FIG. 3B, the direction in which the urging force generated by the urging spring S1 is applied is represented by f.

As depicted in FIG. 3A, the arm section 1412 has, at its lower portion, a shape including a protrusion 1412C protruding downward. In addition, an inclined surface 1412S included in the protrusion 1412C is formed at the lower section of the arm section 1412. The inclined surface 1412S is a slope inclining downward in the clockwise direction.

As depicted in the top figure in FIG. 3A, the holding section 1413 has a shape inclining upward in the clockwise direction in the stand-by state. In addition, as depicted in the bottom figure in FIG. 3A, the holding section 1413 has a shape extending in the horizontal direction H in the chuck state. Note that the posture of the first arm 141 may be restricted such that the direction of extension of the holding section 1413 does not incline further downward from the horizontal direction H. Specifically, as depicted in FIG. 2B, the arm section 1412 of the first arm 141 may be provided with a restricting projection 1412*a* that restricts further downward inclination of the first arm 141 by contacting the edge of the opening 10*a* of the top frame 10.

Similarly, the second arm 142 includes a supported section 1421 supported to be rotatable about the annular section 140, an arm section 1422 that extends from the supported section 1421 along the inner circumferential surface of the annular section 140, and a holding section 1423 that is arranged on the inner side of the arm section 1422 in the radial direction of the annular section 140 and holds the chuck pulley 15 by hooking a part of the upper flange 15*a* of the chuck pulley 15. The holding section 1423 has a shape extending along the circumferential direction of the annular section 140.

As depicted in FIG. 2B, the supported section 1421 has a bearing 1421*a*. The annular section 140 has a pair of support pins 1402*b* arranged at a recessed section 1402*a* formed on the inner surface of the annular section 140. The supported section 1421 is supported rotatably by the annular section 140 due to the fitting of the support pins 1402*b* into the bearing 1421*a*.

In addition, the second arm 142 is urged by an urging spring S2 such that the tip side of the arm section 1422 inclines downward. In FIG. 3C, the direction in which the urging force generated by the urging spring S2 is applied is represented by f.

As depicted in FIG. 3C, the arm section 1422 has, at its lower portion, a shape including a protrusion 1422C protruding downward. In addition, an inclined surface 1422S included in the protrusion 1422C is formed at the lower section of the arm section 1422. The inclined surface 1422S is a slope inclining downward in the clockwise direction.

The holding section 1423 has a shape inclining upward in the clockwise direction in the stand-by state. In addition, the holding section 1423 has a shape extending in the horizontal direction H in the chuck state. Note that the posture of the second arm 142 may be restricted such that the direction of extension of the holding section 1423 does not incline further downward from the horizontal direction H. Specifically, as depicted in FIG. 2B, the arm section 1422 of the second arm 142 may be provided with a restricting projection 1422*a* that restricts further downward inclination of the t second arm 142 by contacting the edge of the opening 10*a* of the top frame 10.

The supported section 1411 and the supported section 1421 are arranged such that the rotation axis of the first arm 141 and the rotation axis of the second arm 142 become parallel to each other. That is, the support pins 1401*b* and the support pins 1402*b* have shapes extending parallel to each other. In addition, the rotation axis of the first arm 141 and the rotation axis of the second arm 142 extend in a direction along the front surface of the optical disc inserted into the optical disc drive 1. That is, the support pins 1401*b* and the support pins 1402*b* extend in a direction along the front surface of the optical disc inserted into the optical disc drive 1.

Note that the first arm 141 and the second arm 142 may be made of resin and made partially hollow. Thus, the shapes of the arms including the protrusions and the inclined surfaces can be stabilized.

[Details of Operation of First Arm 141 and Second Arm 142]

Hereinbelow, details of operation of the first arm 141 and the second arm 142 are explained mainly with reference to FIG. 2B, and FIG. 3A to FIG. 3C. The first arm 141 and the second arm 142 include the inclined surfaces at their lower portions, and change the posture when positions at which the inclined surfaces contact the guide sections 101 and 102 of the top frame 10 change along with the rotation of the annular section 140.

As depicted in the top figure in FIG. 3A, in the stand-by state, the first arm 141 is supported by the top side of the top frame 10. Specifically, the protrusion 1412C of the first arm 141 contacts the guide section 101 of the top frame 10.

The first arm 141 is moved relative to the top frame 10 by the annular section 140 rotating in the clockwise direction represented by an arrow R1 in FIG. 3A. When the moving distance of the first arm 141 relative to the top frame 10 exceeds L1 (first moving distance), the protrusion 1412C falls off from the guide section 101 due to gravity and the urging force of the urging spring S1. Accordingly, when the moving distance relative to the top frame 10 exceeds L1, the posture of the first arm 141 changes. Specifically, as depicted in the middle figure in FIG. 3A, the protrusion 1412C moves to be positioned below the top frame 10. Note that, when the protrusion 1412C falls off from the guide section 101, the magnetic force applied between the chuck pulley 15 and the turntable 30 also contributes to operation of the first arm 141.

Due to the further rotation of the annular section 140, as depicted in the bottom figure in FIG. 3A, the first arm 141 moves relative to the guide section 101 until the first arm 141 has such a posture that the direction of extension of the holding section 1413 coincides with the horizontal direction H.

The second arm 142 also operates similarly to the first arm 141. It should be noted that the timing at which the posture of the second arm 142 changes is later than the timing at which the posture of the first arm 141 changes. That is, a distance L2 (second moving distance, see FIG. 3C) over which the protrusion 1422C of the second arm 142 moves until the protrusion 1422C falls off from the guide section 102 is longer than the distance L1 over which the protrusion 1412C of the first arm 141 moves until the protrusion 1412C falls off from the guide section 101.

Because of this, a portion of the chuck pulley 15 held by the holding section 1413 of the first arm 141 moves downward earlier, and the chuck pulley 15 has an inclined posture. Thereafter, a portion of the second arm 142 held by the holding section 1423 moves downward, and thereby the chuck pulley 15 is arranged at the chuck position. Because of this, as compared with a configuration in which operation of the first arm 141 and the second arm 142 is performed at the same timing, impact sound that is generated when the chuck pulley 15 moves from the stand-by position to the chuck position is reduced.

In addition, in a state where the chuck pulley 15 is at the chuck position, the first arm 141 and the second arm 142 are at such a posture that the holding section 1413 and the holding section 1423 extend in the horizontal direction H.

Furthermore, operation of the first arm 141 when the chuck pulley 15 moves from the chuck position to the stand-by position is explained with reference to FIG. 3B. The first arm 141 can return to the original position since the first arm 141 has the inclined surface 1412S.

The first arm 141 is moved relative to the top frame 10 by the annular section 140 rotating in the counterclockwise direction represented by an arrow R2 in FIG. 3B. At this time, the inclined surface 1412S of the first arm 141 moves along the guide section 101, and moves in a direction opposite to gravity and the urging force of the urging spring S1. Thus, as depicted in the middle figure in FIG. 3B, the protrusion 1412C moves to be positioned above the top frame 10. Due to the further counterclockwise rotation of the annular section 140, the first arm 141 returns to a state depicted in the bottom figure in FIG. 3B.

By operation similar to that of the first arm 141, the second arm 142 also returns to a state depicted in FIG. 3C. It should be noted that the timing at which the protrusion 1422C of the second arm 142 is positioned on the guide section 102 is earlier than the timing at which the protrusion 1412C of the first arm 141 is positioned on the guide section 101. This results in the chuck pulley 15 having a posture inclined from the chuck position and then moving to the stand-by position. Because of this, as compared with a configuration in which operation of the first arm 141 and the second arm 142 is performed at the same timing, impact sound that is generated when the chuck pulley 15 moves from the chuck position to the stand-by position is reduced.

[Overall Operation]

Operation of each mechanism when an optical disc is inserted into the insertion port S of the optical disc drive 1 according to the present embodiment is explained with reference to FIG. 4A to FIG. 9C.

Figure 4A:
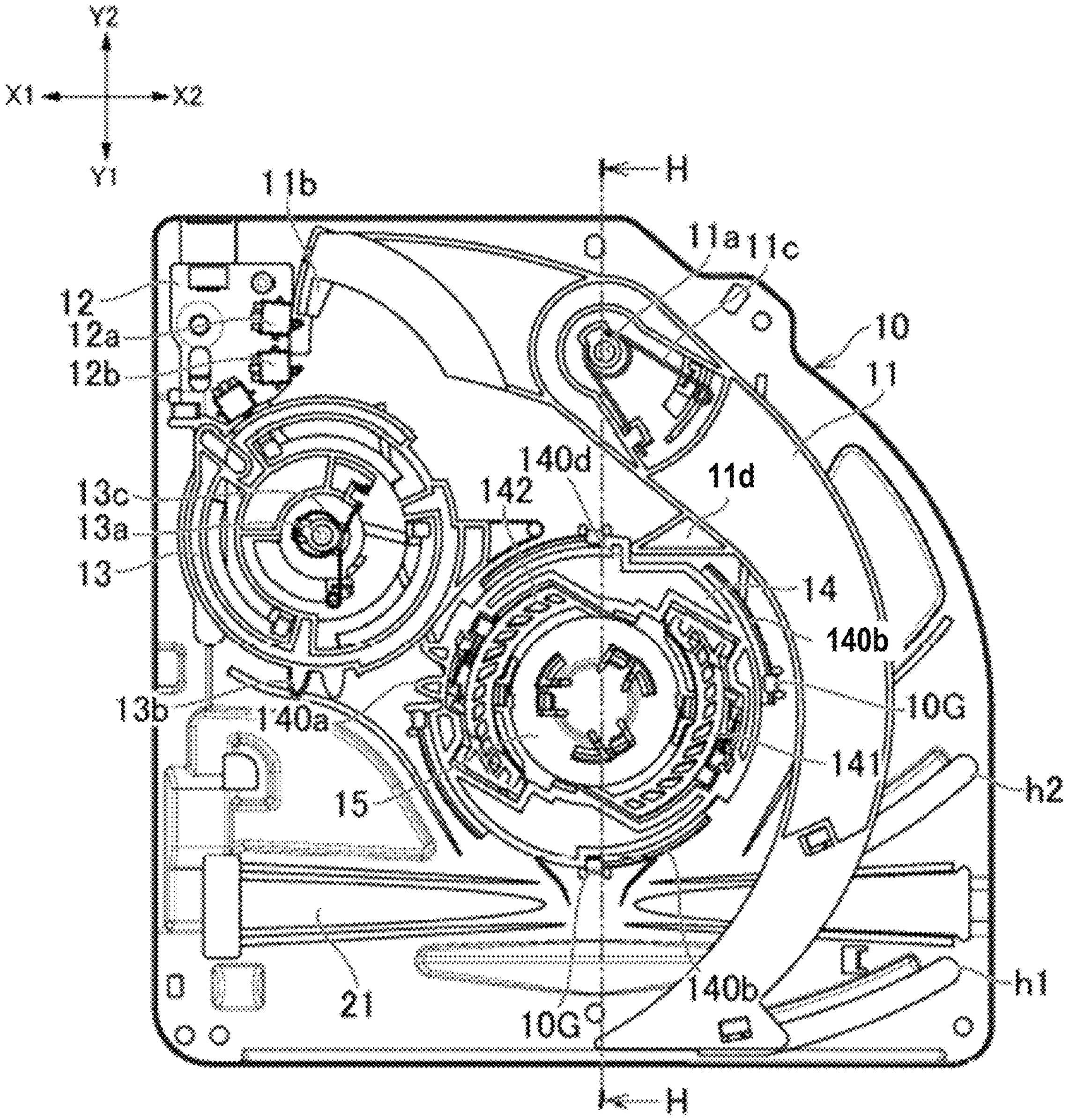
FIG. 4A is a top view of the top frame in the stand-by state.
Figure 5A:
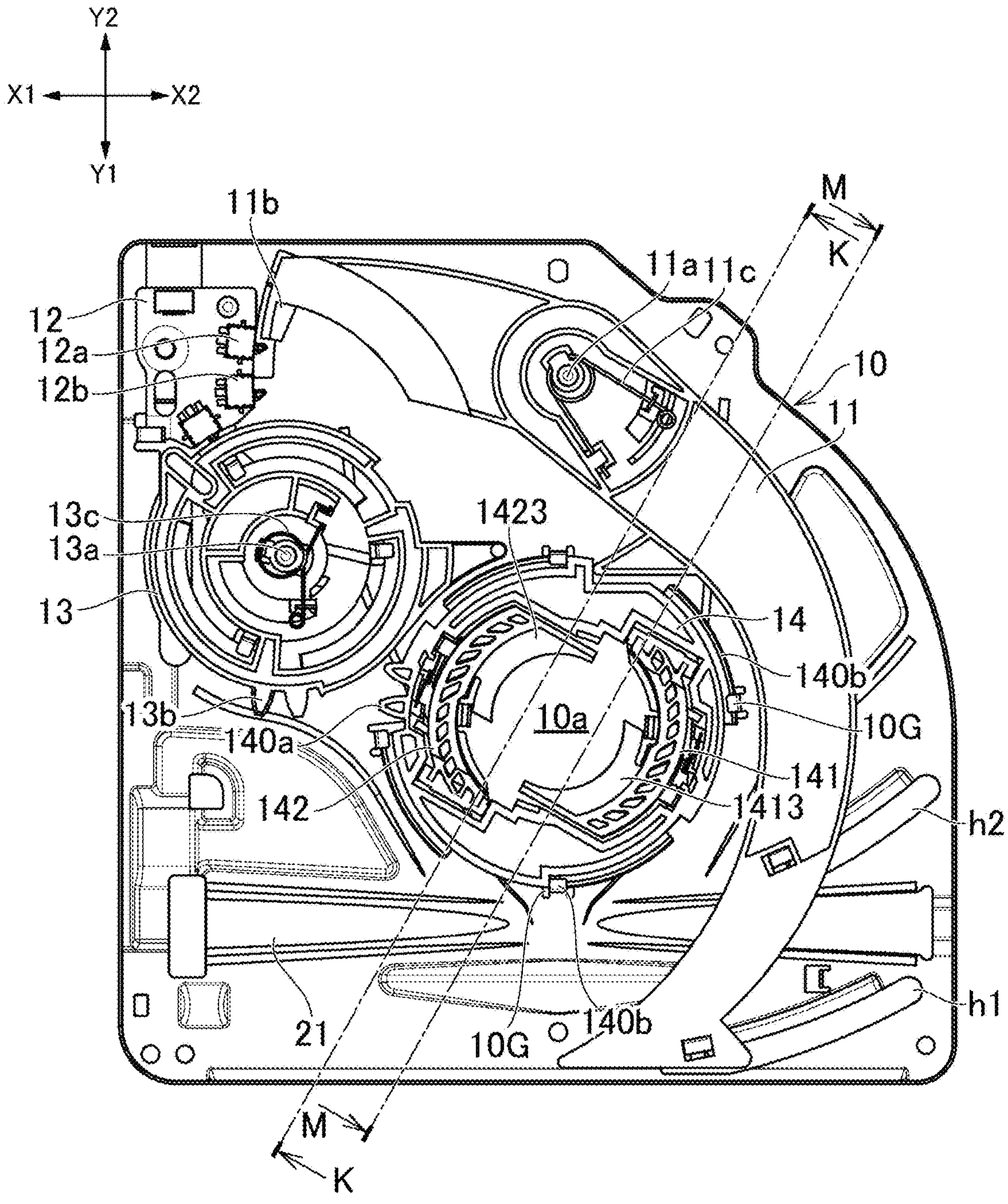
FIG. 5A is a top view of the top frame in the stand-by state, with an illustration of a chuck pulley being omitted.
Figure 5B:
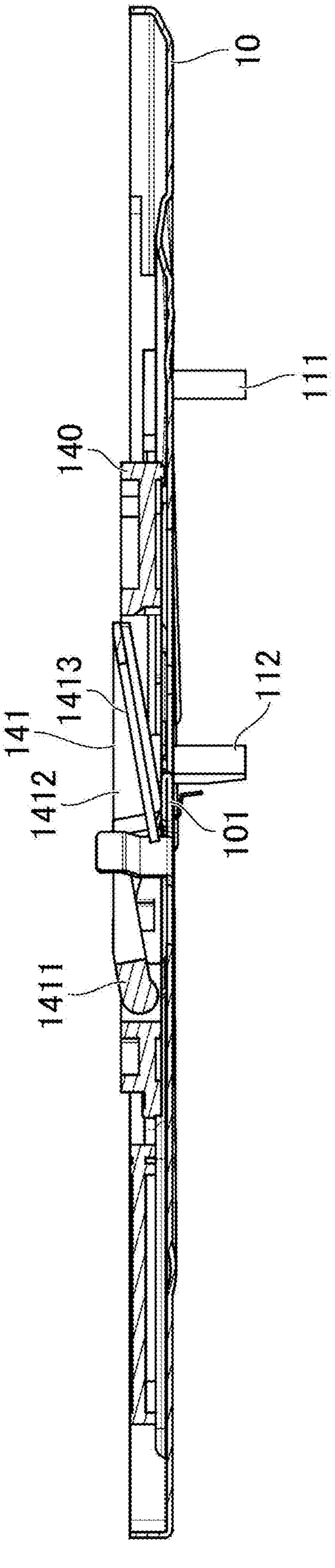
FIG. 5B is a cross-sectional view depicting a cross section cut along a cutting line M-M in FIG. 5A.
Figure 5C:
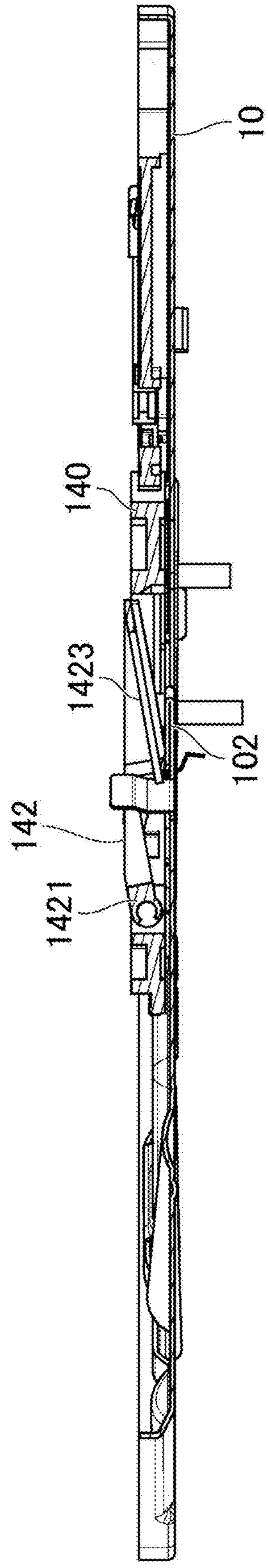
FIG. 5C is a cross-sectional view depicting a cross section cut along a cutting line K-K in FIG. 5A.
Figure 6A:
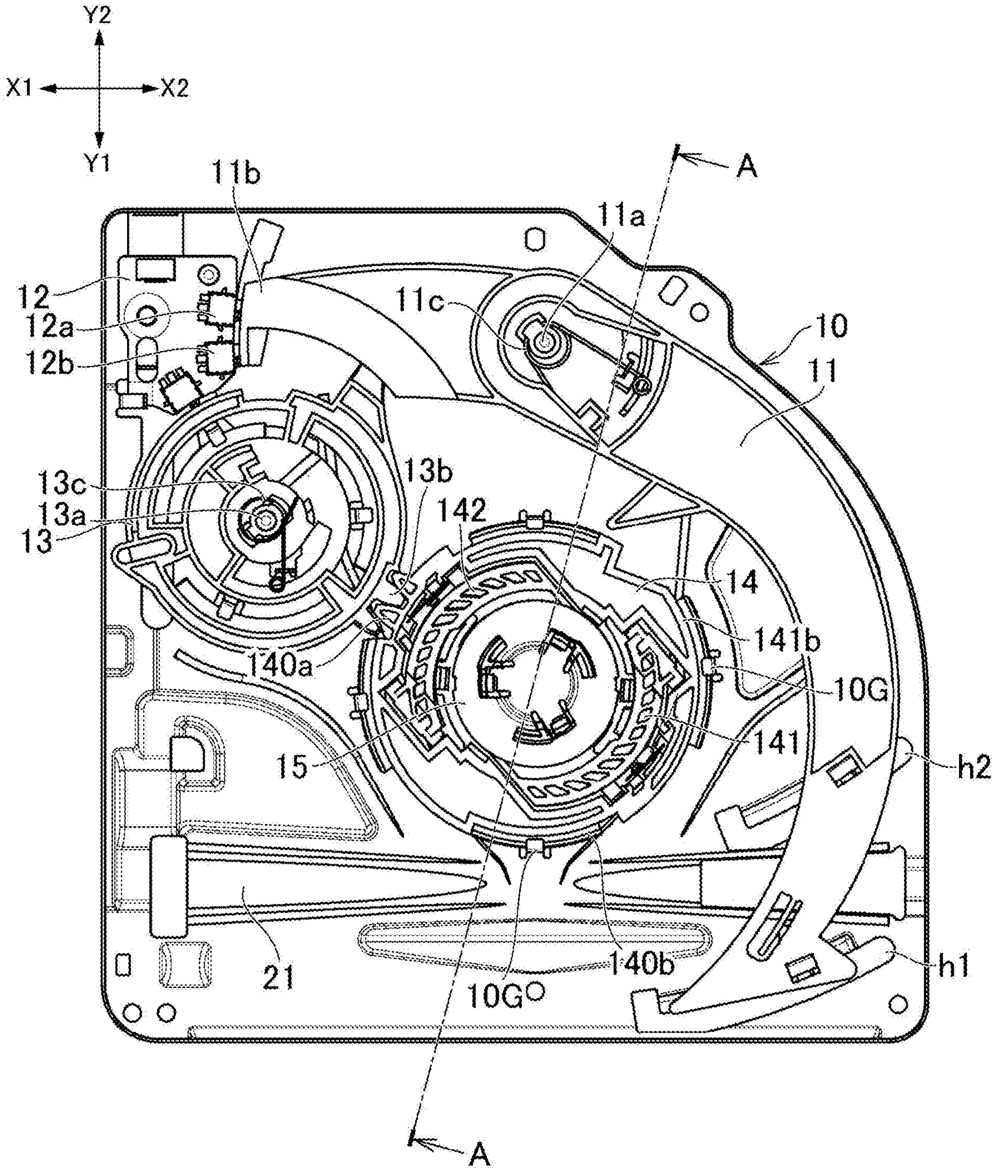
FIG. 6A is a top view of the top frame in a state where the chuck pulley is inclined by the rotation of the first arm.
Figure 6B:
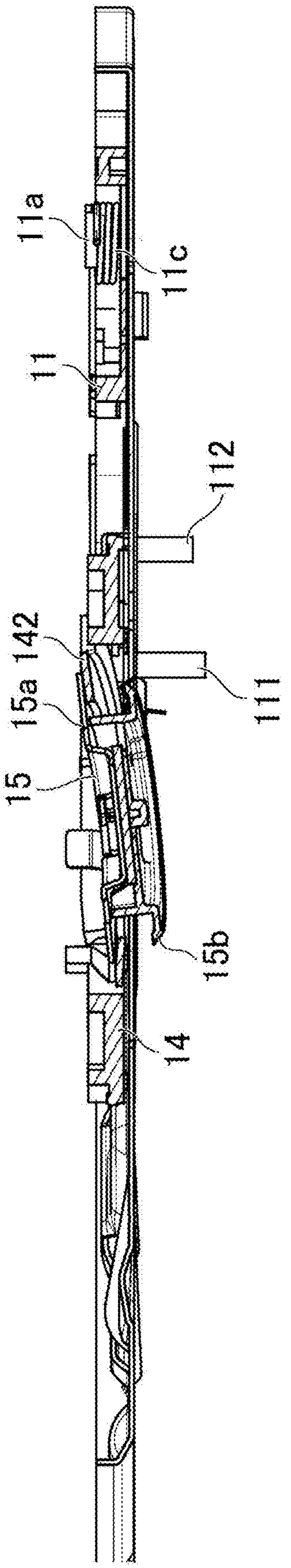
FIG. 6B is a cross-sectional view depicting a cross section cut along a cutting line A-A in FIG. 6A.
Figure 7A:
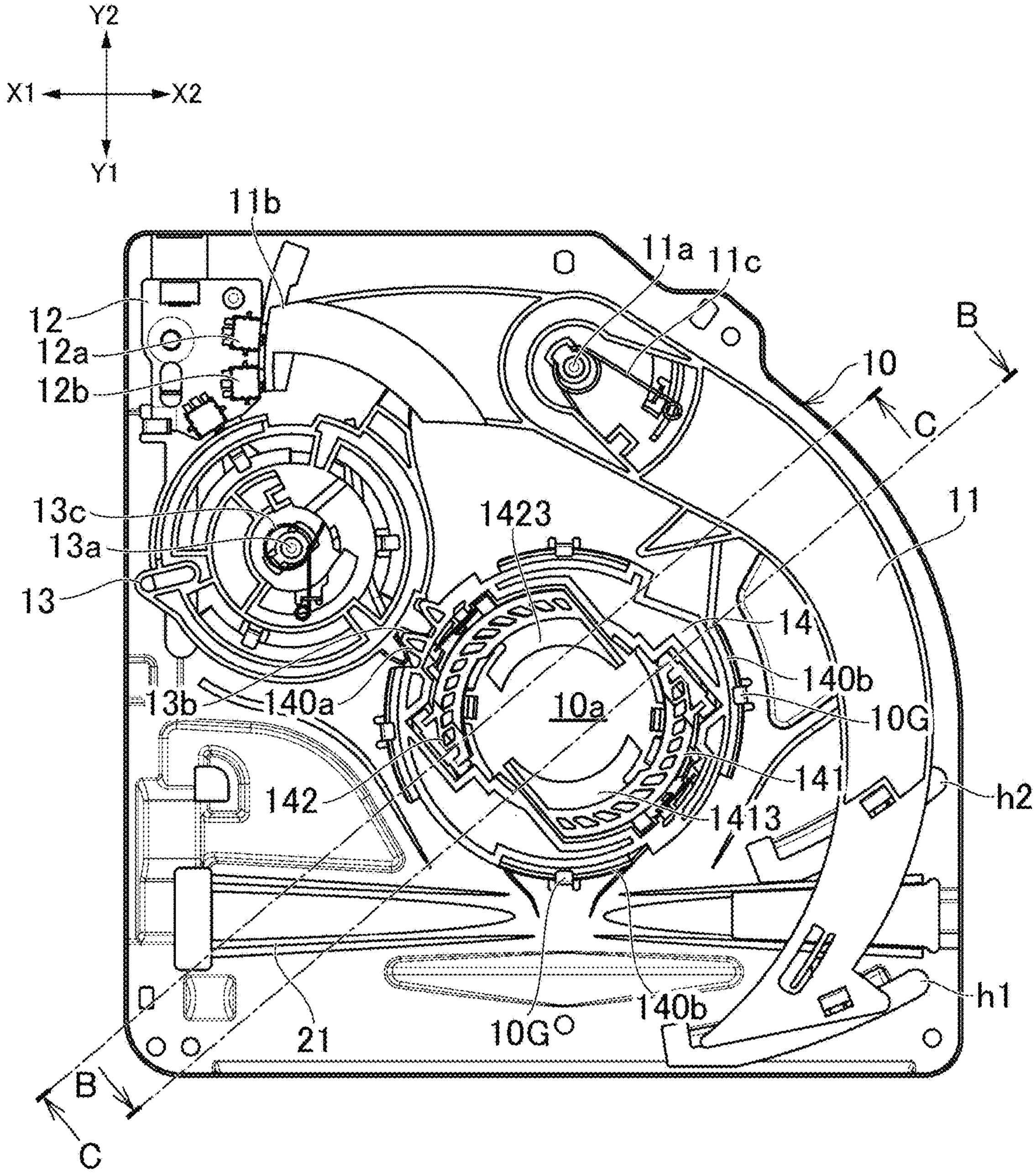
FIG. 7A is a top view of the top frame in a state where the chuck pulley is inclined by the rotation of the first arm, with an illustration of the chuck pulley being omitted.
Figure 7B:
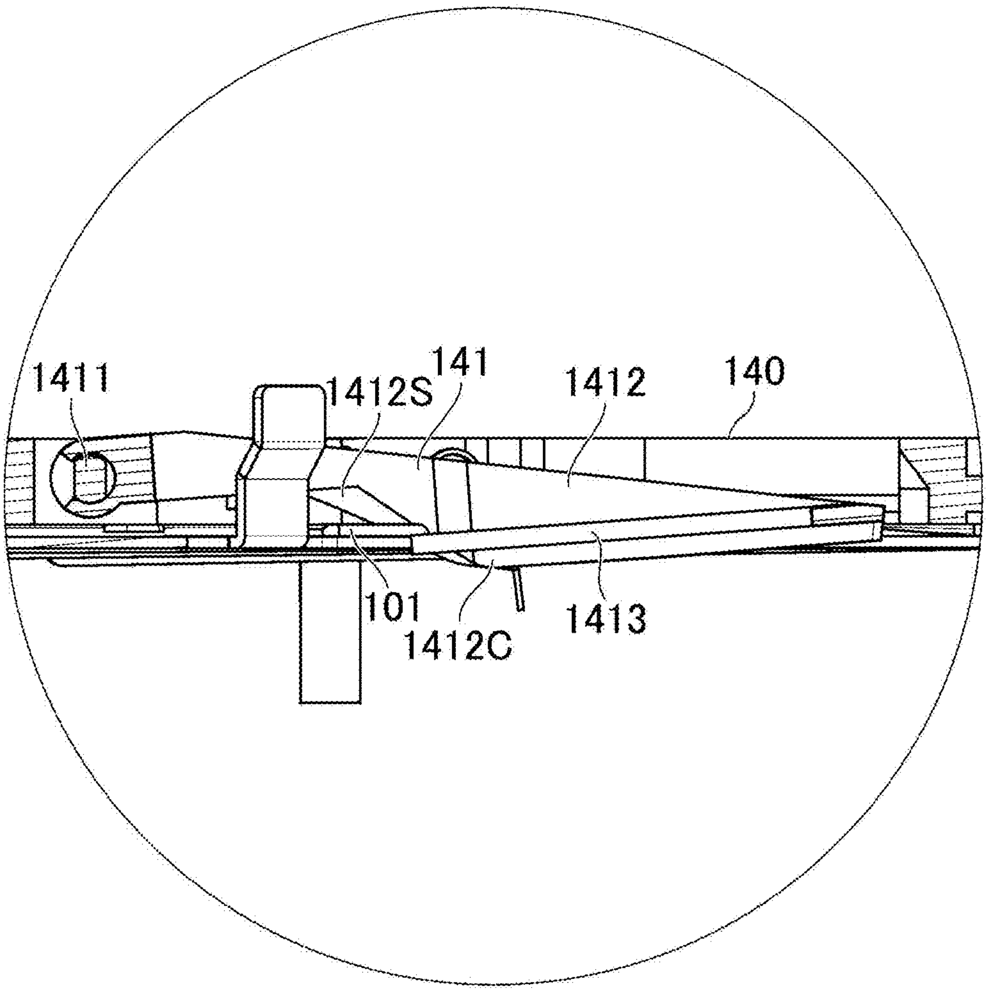
FIG. 7B is a cross-sectional view depicting a cross section cut along a cutting line B-B in FIG. 7A.
Figure 7C:
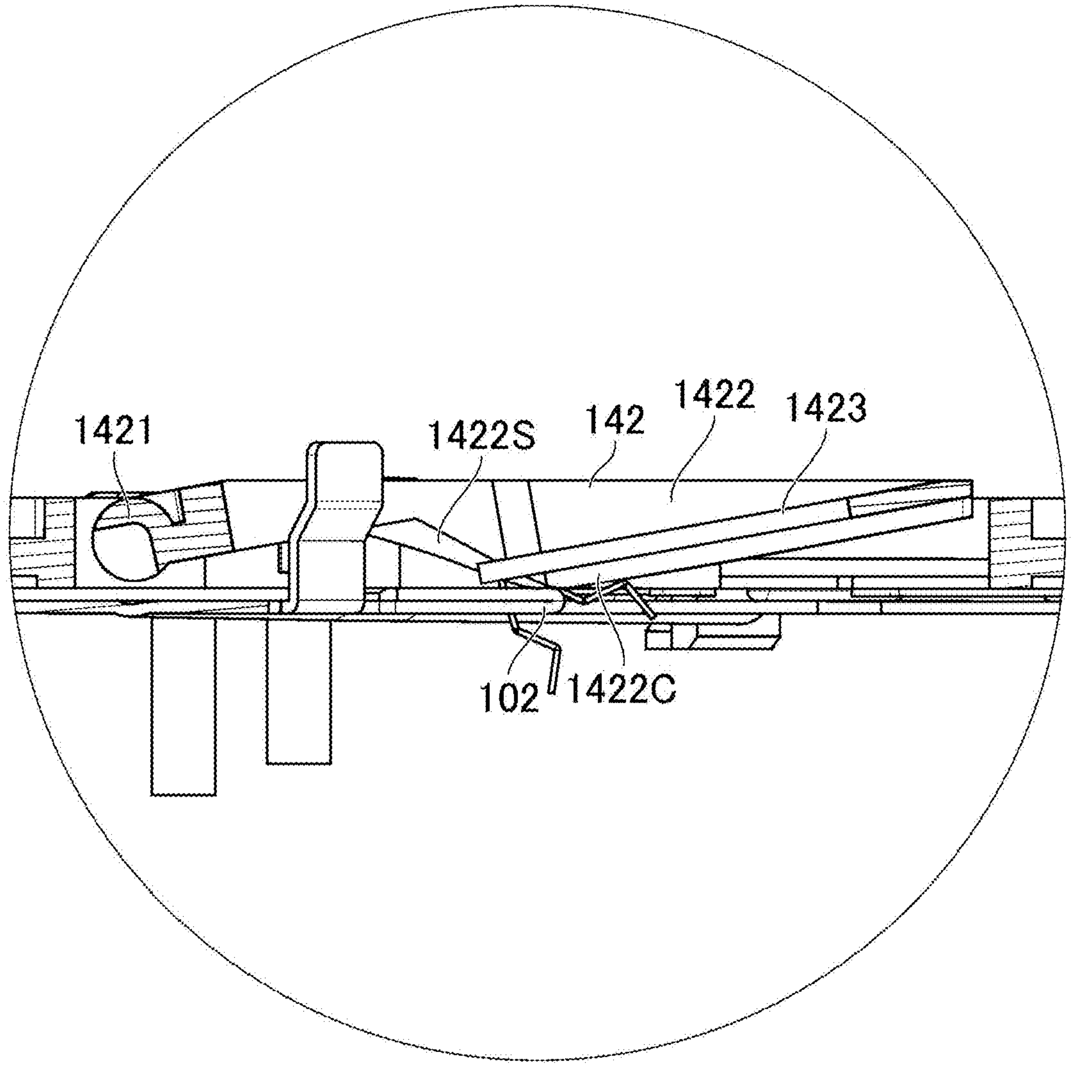
FIG. 7C is a cross-sectional view depicting a cross section cut along a cutting line C-C in FIG. 7A.
Figure 8A:
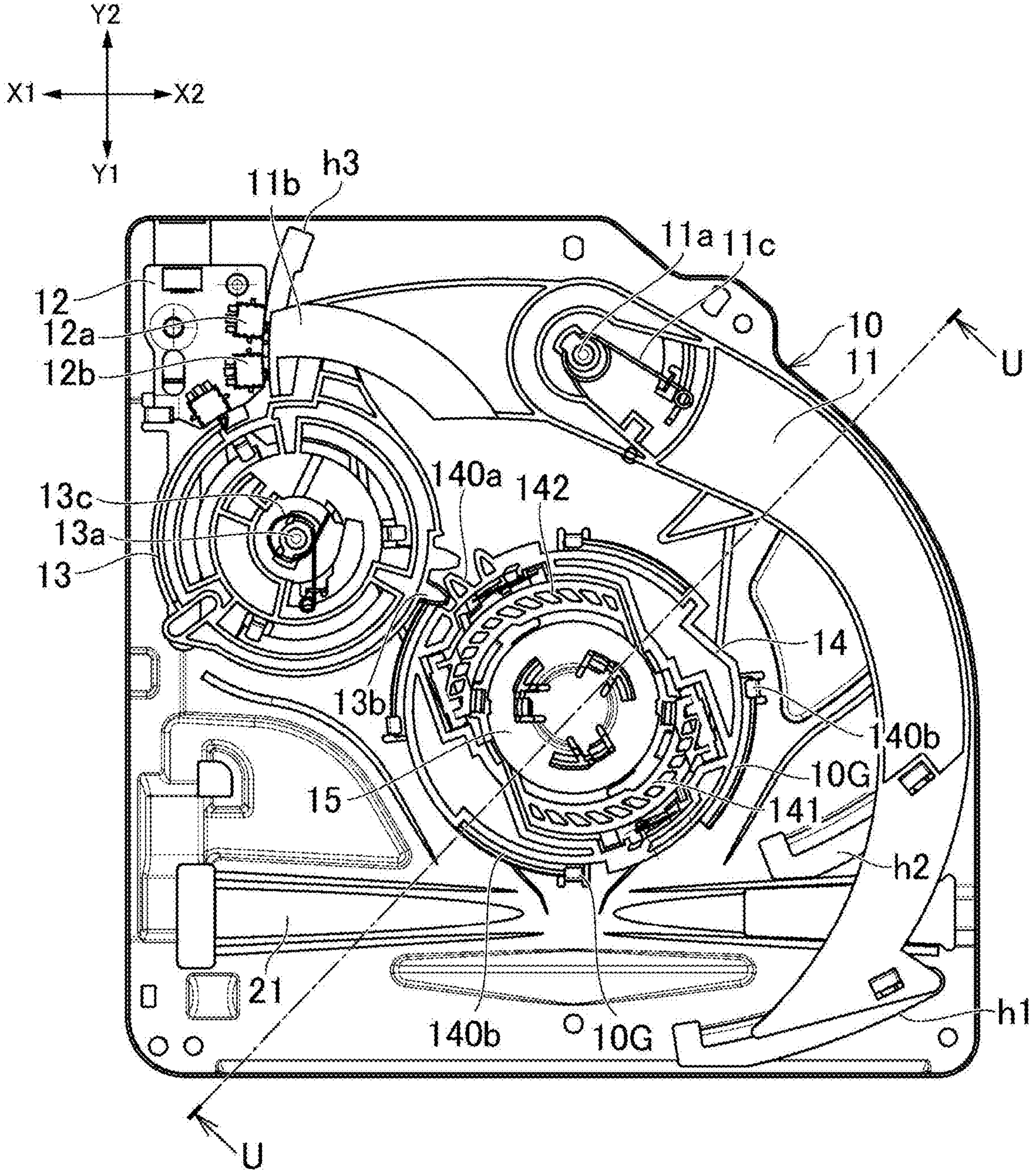
FIG. 8A is a top view of the top frame in the chuck state.
Figure 8B:
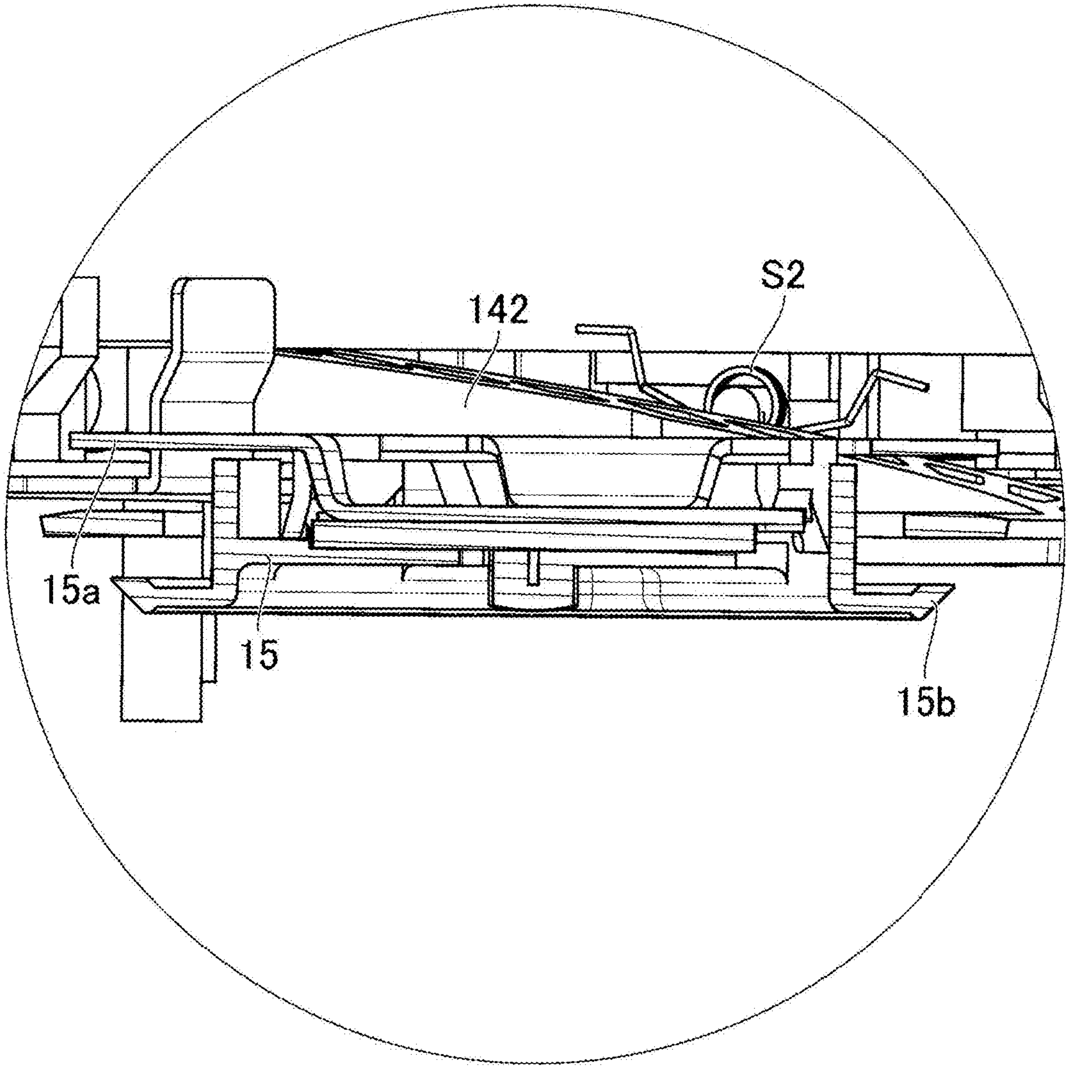
FIG. 8B is a cross-sectional view depicting a cross section cut along a cutting line U-U in FIG. 8A.
Figure 9A:
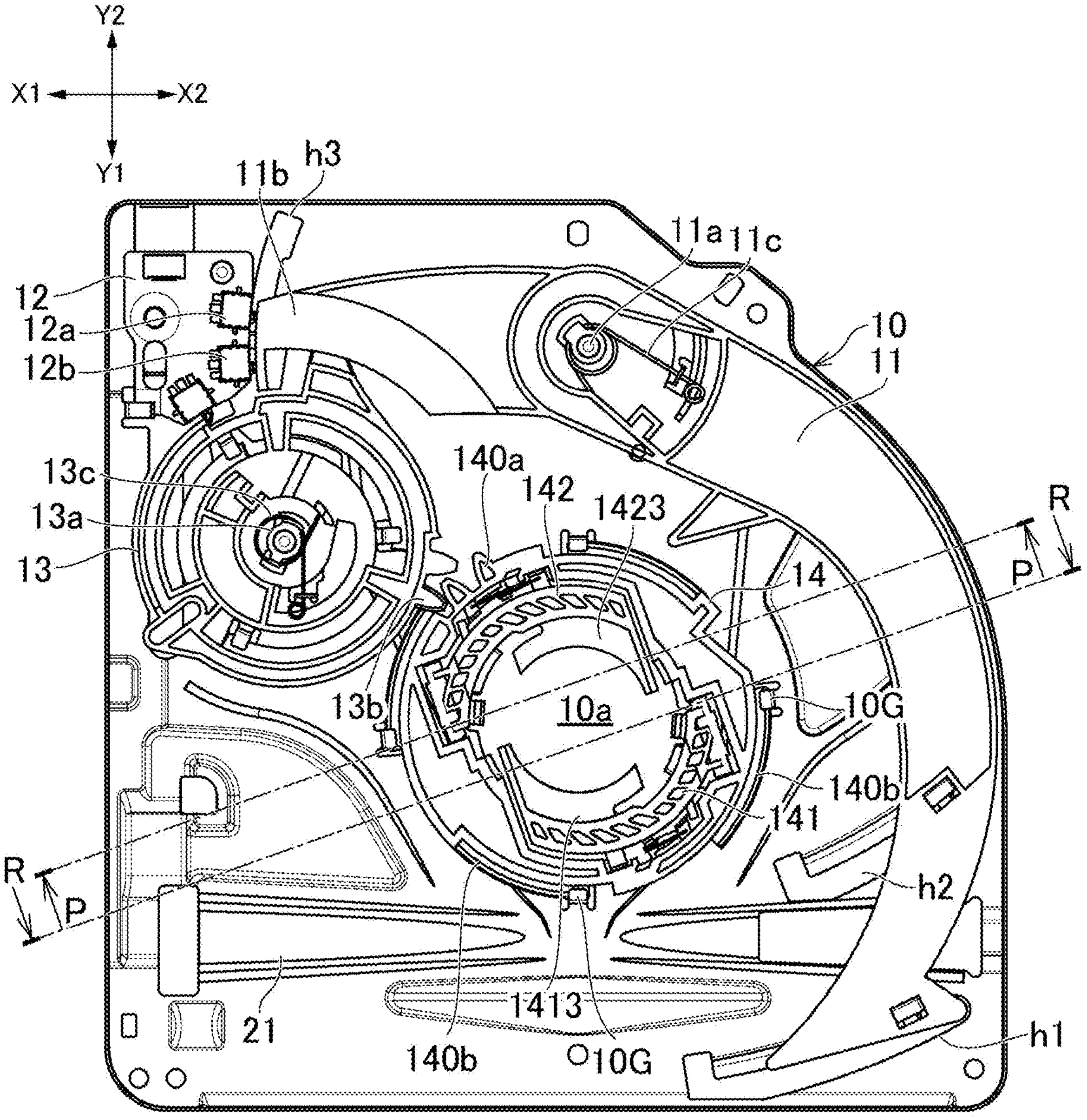
FIG. 9A is a top view of the top frame in the chuck state, with an illustration of the chuck pulley being omitted.
Figure 9B:
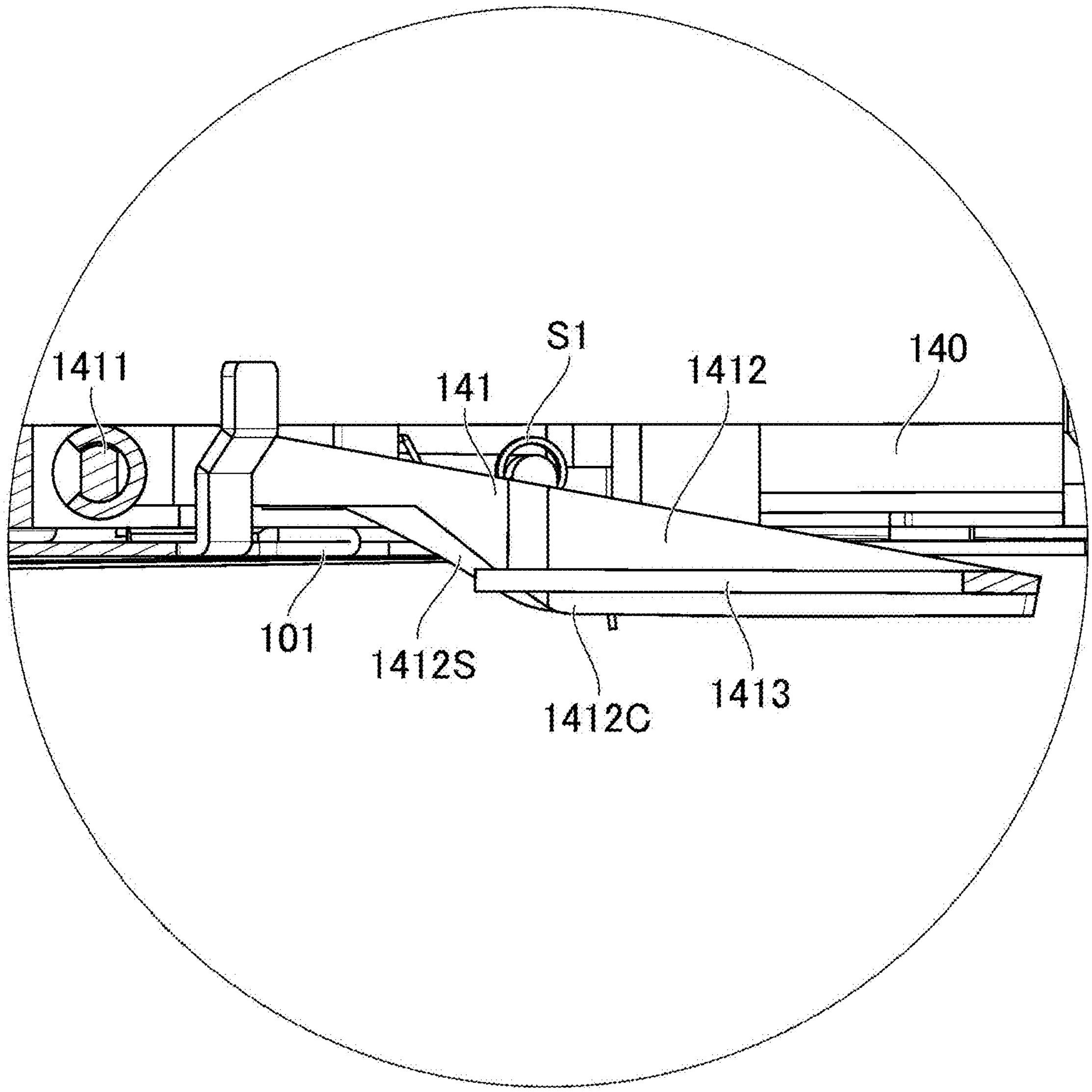
FIG. 9B is a cross-sectional view depicting a cross section cut along a cutting line R-R in FIG. 9A.
Figure 9C:
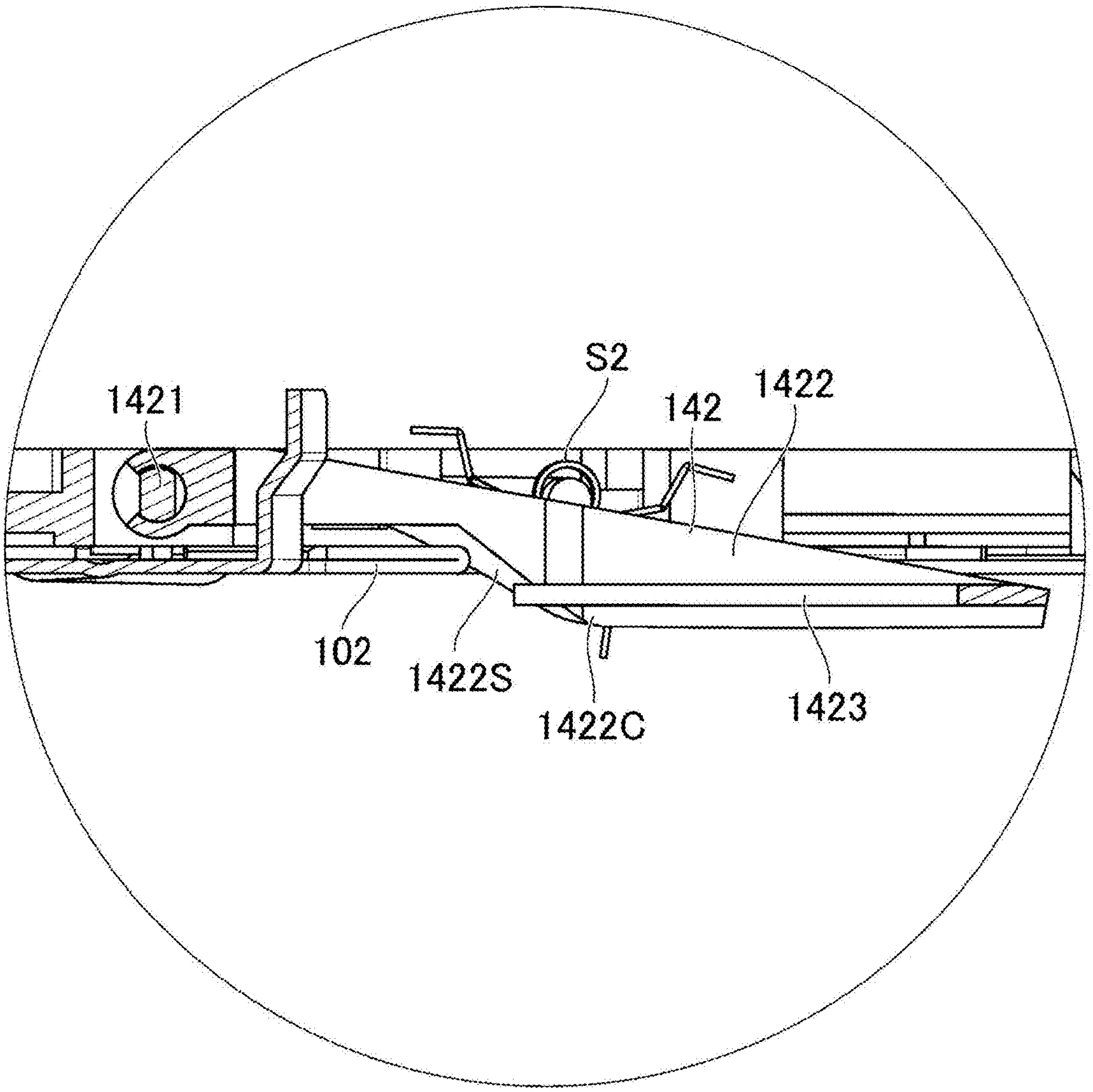
FIG. 9C is a cross-sectional view depicting a cross section cut along a cutting line P-P in FIG. 9A.

FIG. 4A is a top view of the top frame in the stand-by state. FIG. 4B is a cross-sectional view depicting a cross section cut along a cutting line H-H in FIG. 4A. FIG. 5A is a top view of the top frame in the stand-by state, with an illustration of the chuck pulley being omitted. FIG. 5B is a cross-sectional view depicting a cross section cut along a cutting line M-M in FIG. 5A. FIG. 5C is a cross-sectional view depicting a cross section cut along a cutting line K-K in FIG. 5A. FIG. 6A is a top view of the top frame in a state where the chuck pulley is inclined by the rotation of the first arm. FIG. 6B is a cross-sectional view depicting a cross section cut along a cutting line A-A in FIG. 6A. FIG. 7A is a top view of the top frame in a state where the chuck pulley is inclined by the rotation of the first arm, with an illustration of the chuck pulley being omitted. FIG. 7B is a cross-sectional view depicting a cross section cut along a cutting line B-B in FIG. 7A. FIG. 7C is a cross-sectional view depicting a cross section cut along a cutting line C-C in FIG. 7A. FIG. 8A is a top view of the top frame in the chuck state. FIG. 8B is a cross-sectional view depicting a cross section cut along a cutting line U-U in FIG. 8A. FIG. 9A is a top view of the top frame in the chuck state, with an illustration of the chuck pulley being omitted. FIG. 9B is a cross-sectional view depicting a cross section cut along a cutting line R-R in FIG. 9A. FIG. 9C is a cross-sectional view depicting a cross section cut along a cutting line P-P in FIG. 9A.

Before an optical disc is inserted into the insertion port S, each mechanism of the optical disc drive 1 is in the stand-by state depicted in FIG. 4A.

As depicted in FIG. 5B, in the stand-by state, the first arm 141 is supported by the guide section 101 of the top frame 10. Accordingly, the holding section 1413 of the first arm 141 is at a position above the top frame 10. Similarly, as depicted in FIG. 5C, the second arm 142 is supported by the guide section 102 of the top frame 10. Accordingly, the holding section 1423 of the second arm 142 is at a position above the top frame 10.

Figure 4B:
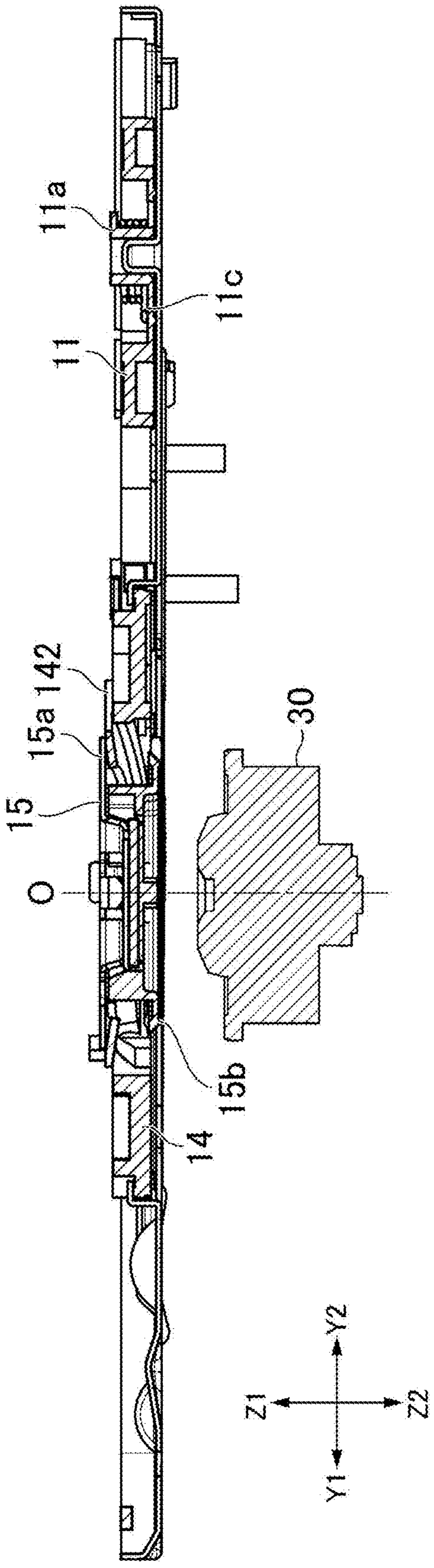
FIG. 4B is a cross-sectional view depicting a cross section cut along a cutting line H-H in FIG. 4A.

Because of this, in the stand-by state, as depicted in FIG. 4B, the pulley 15 is at the stand-by position, and a gap serving as a transport path of the optical disc is formed between the pulley 15 and the turntable 30.

First, the switch arm 11 is rotated counterclockwise about the supported section 11*a* as the rotation axis by the edge of the optical disc inserted into the insertion port S pressing the contact sections 111 and 112 of the switch arm 11 leftward. Thus, the switch operation section 11*b* formed at the rear end of the switch arm 11 presses the start switch 12*a* of the switch board 12.

Pressing the start switch 12*a* starts the rotation of an unillustrated motor housed in the bottom frame 20. The rotational force of the motor is transmitted to the transport roller 21 via a gear train, which is a transmission mechanism. The optical disc is transported backward due to the rotation of the transport roller 21. Note that the optical disc drive 1 has a plurality of gear trains and the like, which are transmission mechanisms, including also ones mentioned later, and detailed explanation of the structures and operation thereof is omitted.

While the optical disc is being transported, the edge of the optical disc hits the contact section protruding downward from the rotary arm 13, and the rotary arm 13 rotates counterclockwise. The rotational force of the rotary arm 13 is transmitted to a roller bracket holding the transport roller 21 via a gear train, which is a transmission mechanism. Thus, the roller bracket moves to a retraction position, which is apart downward from the transport path of the optical disc.

The rotation of the motor driving the transport roller 21 is stopped by the switch operation section 11*b* formed at the rear end of the switch arm 11 further rotated counterclockwise pressing the stop switch 12*b* of the switch board 12.

In this process, the protruding section 13*b* of the rotary arm 13 rotated counterclockwise hits the protruding section 140*a* of the pulley holding mechanism 14, and the annular section 140 of the pulley holding mechanism 14 rotates clockwise. FIG. 6A depicts a state where the annular section 140 of the pulley holding mechanism 14 is rotated clockwise by the protruding section 13*b* hitting the protruding section 140*a*.

The inclined surface 1412S of the first arm 141 is moved relative to the guide section 101 of the top frame 10 by the annular section 140 rotating clockwise. This results in at least a part of the first arm 141 being positioned below the top frame 10 (see FIG. 7B and the bottom figure in FIG. 3A). At this time, as depicted in FIG. 7C, the second arm 142 is kept being supported on the guide section 102 of the top frame 10.

Since the posture of the first arm 141 changes and the posture of the second arm 142 is kept in the stand-by state as mentioned above, as depicted in FIG. 6B, the portion of the chuck pulley 15 held by the holding section 1413 is inclined downward.

The further clockwise rotation of the annular section 140 in the state depicted in FIG. 7A results in a state depicted in FIG. 8A. In this state, at least a part of the second arm 142 results in being positioned below the top frame 10 (see FIG. 9C).

As depicted in FIG. 8B, the chuck pulley 15 is moved to the chuck position by both the first arm 141 and the second arm 142 inclining downward. The chuck pulley 15 having moved to the chuck position sandwiches the optical disc in the up-down direction by magnetic force applied between the chuck pulley 15 and the turntable 30. It becomes possible for the optical disc to rotate integrally with the turntable 30.

Note that the configuration and operation of each mechanism explained above are examples, and the configuration of each mechanism that operates until the annular section 140 starts rotating is not limited to the example described above. That is, other mechanisms may be included as long as the mechanisms cause the annular section 140 to start rotating along with the insertion of the optical disc. Note that, when the optical disc is taken out from the optical disc drive 1, the reverse operation of the operation described above may be performed.

Here, the switch arm 11 may be provided with a positioning section 11*d* that determines the position of the pulley holding mechanism 14 in the stand-by state. As depicted in FIG. 4A, the positioning section 11*d* may be a portion that protrudes toward the pulley holding mechanism 14 in the stand-by state and receives the urging force of the urging spring 11*c* to contact the outer circumferential section of the annular section 140 of the pulley holding mechanism 14. By adopting such a configuration, the position of the pulley holding mechanism 14 in the stand-by state can be determined without additionally attaching a positioning spring or the like to the pulley holding mechanism 14. Note that, as depicted in FIG. 4A, a recessed section 140*d* to which the positioning section 11*d* fits in the stand-by state may be formed at the outer circumferential section of the annular section 140.

In the present embodiment, by adopting the configuration in which the posture of the first arm 141 and the second arm 142 is changed by causing the first arm 141 and the second arm 142 to contact the edge of the opening of the top frame 10, it is not necessary to additionally use components that move the arms, and the number of components can be reduced. In addition, each of the first arm 141 and the second arm 142 includes the inclined surface at its lower section, and changes the posture depending on a position at which the inclined surface contacts the edge of the opening of the top frame 10. Thus, the chuck pulley 15 can be moved downward without w increasing the movement amount of the annular section 140 in the rotation direction. In addition, the portion that operates the first arm 141 and the second arm 142 by contacting the arms is the top frame 10 including a metal sheet, and thereby the durability is high as compared with a case where resin mechanisms are used. In addition, in the present embodiment, since the configuration in which parts of the first arm 141 and the second arm 142 move to be positioned below the top frame 10 to thereby move the chuck pulley 15 to the chuck position is adopted, the thickness can be reduced as compared with a configuration in which the overall mechanism to move the chuck pulley in the up-down direction is arranged above the top frame 10.

In addition, in the present embodiment, since the configuration in which parts of the first arm 141 and the second arm 142 are positioned below the top frame 10 to thereby move the chuck pulley 15 to the chuck position is adopted, the size of the opening 10*a* can be reduced as compared with a configuration in which the overall mechanism to hold the chuck pulley is moved downward. Accordingly, the rigidity of the top frame 10 can be maintained.

CONCLUSION

For example, the optical disc drive can also have configurations like those described below.

(1)

An optical disc drive including:
- a turntable for rotating an optical disc;
- a chuck pulley;
- a top frame having an opening formed at a position overlapping the chuck pulley in a plan view; and
- a first arm that holds the chuck pulley, in which
- the first arm includes an inclined surface at a lower portion thereof, contacts a first edge of the opening, and changes a posture so as to move the chuck pulley between a stand-by position and a chuck position at which the first arm and the turntable sandwich the optical disc depending on a position at which the inclined surface contacts the first edge.

(2)

The optical disc drive according to (1), in which at least a part of the first arm is arranged below the top frame in a state where the chuck pulley is at the chuck position.

(3)

The optical disc drive according to (1) or (2), including:
- an annular section that rotates depending on movement of the optical disc and supports the first arm, in which
- the first arm includes a holding section that extends along a circumferential direction of the annular section and holds at least a part of the chuck pulley.

(4)

The optical disc drive according to (3), in which the annular section has a rail section that slides along a guide section formed on the top frame, the rail section being formed at an outer circumferential section of the annular section.

(5)

The optical disc drive according to (3) or (4), in which a flange is formed at an upper end of the chuck pulley, and the holding section is provided such that the holding section hooks the flange.

(6)

The optical disc drive according to any one of (3) to (5), in which the holding section has a shape extending in a direction parallel to a front surface of the optical disc inserted into the optical disc drive in a state where the chuck pulley is at the chuck position.

(7)

The optical disc drive according to any one of (3) to (6), in which the holding section is positioned below the top frame in a state where the chuck pulley is at the chuck position.

(8)

The optical disc drive according to any one of (1) to (7), in which the first arm is provided with an urging spring that urges a tip side of the first arm such that the tip side is inclined downward.

(9)

The optical disc drive according to any one of (1) to (8), in which the top frame includes a metal sheet, and the first edge includes a dual-layer plate formed by bending a part of the metal sheet.

(10)

The optical disc drive according to any one of (1) to (9), in which the first arm is a hollow resin member.

(11)

The optical disc drive according to any one of (1) to (10), including:

a second arm that is arranged opposite the first arm with the opening being interposed therebetween and holds the chuck pulley, in which the second arm contacts a second edge of the opening, and changes a posture so as to move the chuck pulley between the stand-by position and the chuck position depending on a position at which the second arm contacts the second edge.

(12)

The optical disc drive according to (11), including:

an annular section that rotates depending on insertion of the optical disc and supports the first arm and the second arm, in which the first arm moves on the first edge along with rotation of the annular section, and changes a posture so as to move the chuck pulley from the stand-by position to the chuck position when a moving distance exceeds a first moving distance, the second arm moves on the second edge along with rotation of the annular section, and changes a posture so as to move the chuck pulley from the stand-by position to the chuck position when a moving distance exceeds a second moving distance, and the first moving distance is shorter than the second moving distance.

(13)

The optical disc drive according to (11) or (12), in which a length of the first edge in a moving direction of the first arm is shorter than a length of the second edge in a moving direction of the second arm.

The invention claimed is:

1. An optical disc drive comprising:

a turntable for rotating an optical disc;

a chuck pulley;

a top frame having an opening formed at a position overlapping the chuck pulley in plan view; and a first arm that holds the chuck pulley, wherein the first arm includes an inclined surface at a lower portion thereof, contacts a first edge of the opening, and changes a posture so as to move the chuck pulley between a stand-by position and a chuck position at which the chuck pulley and the turntable sandwich the optical disc depending on a position at which the inclined surface contacts the first edge.

2. The optical disc drive according to claim 1, wherein at least a part of the first arm is arranged below the top frame in a state where the chuck pulley is at the chuck position.

3. The optical disc drive according to claim 1, comprising:

an annular section that rotates depending on movement of the optical disc and supports the first arm, wherein the first arm includes a holding section that extends along a circumferential direction of the annular section and holds at least a part of the chuck pulley.

4. The optical disc drive according to claim 3, wherein the annular section has a rail section that slides along a guide section formed on the top frame, the rail section being formed at an outer circumferential section of the annular section.

5. The optical disc drive according to claim 3, wherein a flange is formed at an upper end of the chuck pulley, and the holding section is provided such that the holding section hooks the flange.

6. The optical disc drive according to claim 3, wherein the holding section has a shape extending in a direction parallel to a front surface of the optical disc inserted into the optical disc drive in a state where the chuck pulley is at the chuck position.

7. The optical disc drive according to claim 3, wherein the holding section is positioned below the top frame in a state where the chuck pulley is at the chuck position.

8. The optical disc drive according to claim 1, wherein the first arm is provided with an urging spring that urges a tip side of the first arm such that the tip side is inclined downward.

9. The optical disc drive according to claim 1, wherein the top frame includes a metal sheet, and the first edge includes a dual-layer plate formed by bending a part of the metal sheet.

10. The optical disc drive according to claim 1, wherein the first arm is a hollow resin member.

11. The optical disc drive according to claim 1, comprising:

a second arm that is arranged opposite the first arm with the opening being interposed therebetween and holds the chuck pulley, wherein the second arm contacts a second edge of the opening, and changes a posture so as to move the chuck pulley between the stand-by position and the chuck position depending on a position at which the second arm contacts the second edge.

12. The optical disc drive according to claim 11, comprising:

an annular section that rotates depending on insertion of the optical disc and supports the first arm and the second arm, wherein the first arm moves on the first edge along with rotation of the annular section, and changes a posture so as to move the chuck pulley from the stand-by position to the chuck position when a moving distance exceeds a first moving distance, the second arm moves on the second edge along with rotation of the annular section, and changes a posture so as to move the chuck pulley from the stand-by position to the chuck position when a moving distance exceeds a second moving distance, and the first moving distance is shorter than the second moving distance.

13. The optical disc drive according to claim 12, wherein a length of the first edge in a moving direction of the first arm is shorter than a length of the second edge in a moving direction of the second arm.

* * * * *